United States Patent
Iimura et al.

(10) Patent No.: US 12,408,717 B2
(45) Date of Patent: Sep. 9, 2025

(54) HAIR PLANTING APPARATUS

(71) Applicants: JUKI CORPORATION, Tama (JP); ARTNATURE INC., Tokyo (JP)

(72) Inventors: Honoka Iimura, Tama (JP); Jiro Obama, Tama (JP); Masaki Sasaki, Tama (JP); Shogo Kamada, Tama (JP); Naoki Kurita, Tama (JP)

(73) Assignees: JUKI CORPORATION, Tama (JP); ARTNATURE INC., Tokyo (JP)

( * ) Notice: Subject to any disclaimer, the term of this patent is extended or adjusted under 35 U.S.C. 154(b) by 92 days.

(21) Appl. No.: 18/123,572

(22) Filed: Mar. 20, 2023

(65) Prior Publication Data

US 2023/0301384 A1 Sep. 28, 2023

(30) Foreign Application Priority Data

Mar. 22, 2022 (JP) ................................ 2022-044917

(51) Int. Cl.
 *A41G 3/00* (2006.01)
 *G05B 19/404* (2006.01)
 (Continued)

(52) U.S. Cl.
 CPC ......... *A41G 3/0075* (2013.01); *G05B 19/404* (2013.01); *G06T 7/0004* (2013.01);
 (Continued)

(58) Field of Classification Search
 CPC ...... A41G 3/00; A41G 3/0075; A41G 3/0066; D05C 15/02; A63H 3/44
 (Continued)

(56) References Cited

U.S. PATENT DOCUMENTS

2001/0035190 A1* 11/2001 Fukuyama ........... A41G 3/0075
132/53

FOREIGN PATENT DOCUMENTS

| DE | 10000986 C1 * | 9/2001 | ........... A41G 3/0066 |
| JP | 2018-040084 A | 3/2018 | |

(Continued)

OTHER PUBLICATIONS

English translation of WO2020175109 obtained via espacenet.com (last visited Aug. 14, 2024). (Year: 2024).*

(Continued)

*Primary Examiner* — Patrick J. Lynch
(74) *Attorney, Agent, or Firm* — Faegre Drinker Biddle & Reath LLP

(57) ABSTRACT

A hair planting apparatus includes a mounting portion for mounting a base material, and including a work opening for planting, a hair planting unit for binding hair for planting to the material in the work opening, a transport mechanism for positioning the hair planting unit relative to each mesh hole of the material mounted on the mounting portion, an imaging unit for capturing images of a plurality of mesh holes of the material mounted on the mounting portion, a tilt detection unit for obtaining, from the image captured by the imaging unit, an alignment direction of the mesh holes of the material, and a correction mechanism for correcting the orientation of the material on the mounting portion according to a tilt angle of the alignment direction of the mesh holes of the material with respect to a predetermined direction.

7 Claims, 20 Drawing Sheets

(51) Int. Cl.
  *G06T 7/00* (2017.01)
  *G06T 7/70* (2017.01)
  *H04N 23/695* (2023.01)

(52) U.S. Cl.
  CPC ............. *G06T 7/70* (2017.01); *H04N 23/695* (2023.01); *G05B 2219/37404* (2013.01)

(58) Field of Classification Search
  USPC ...................................................... 112/80.02
  See application file for complete search history.

(56) References Cited

FOREIGN PATENT DOCUMENTS

WO    WO-2020/175109 A1    9/2020
WO    WO-2020175110 A1 *   9/2020

OTHER PUBLICATIONS

Extended European Search Report issued Jul. 20, 2023 in Application No. 23162855.3.

* cited by examiner

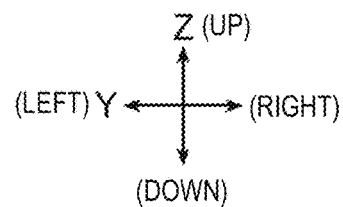
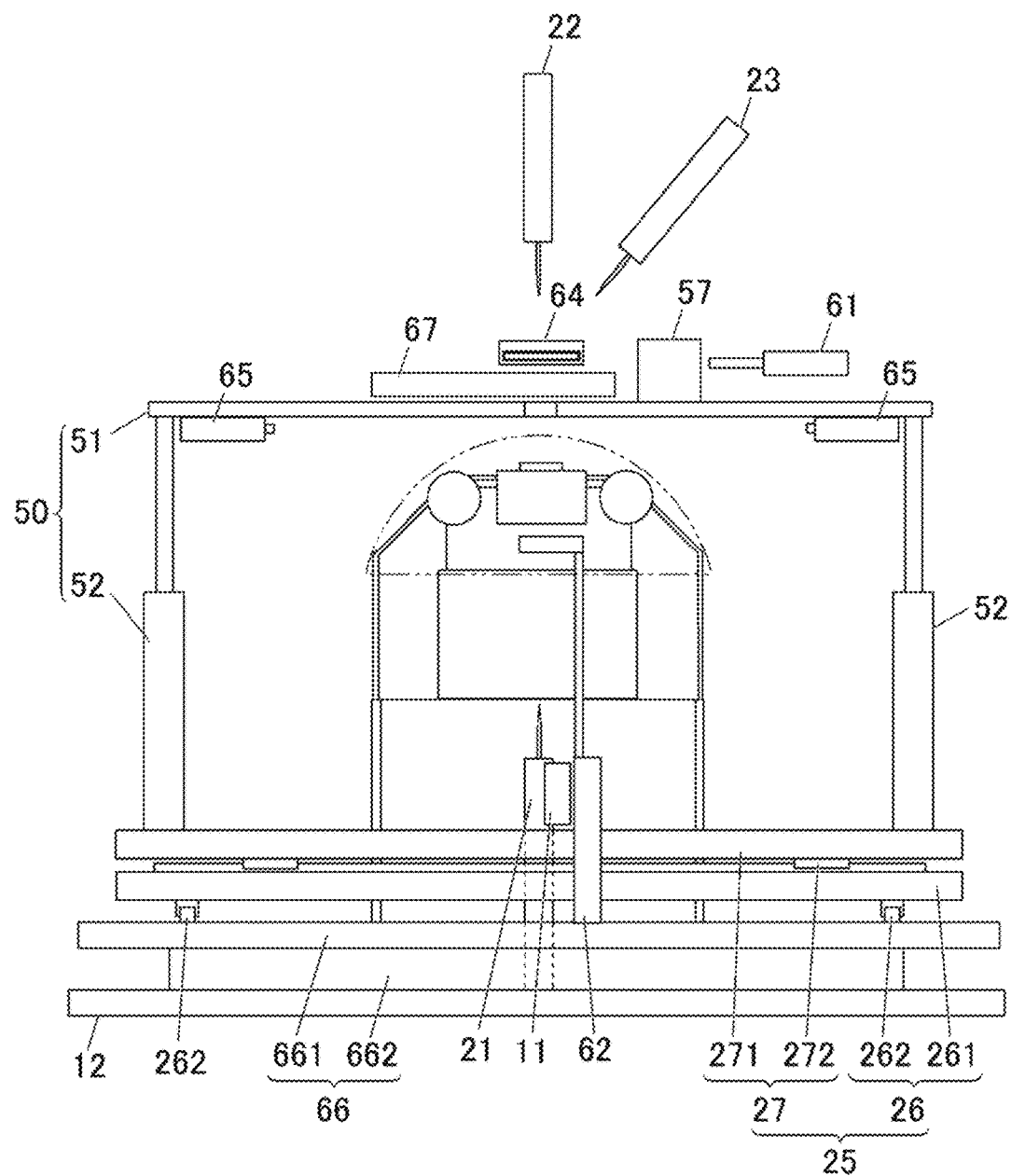

FIG.18
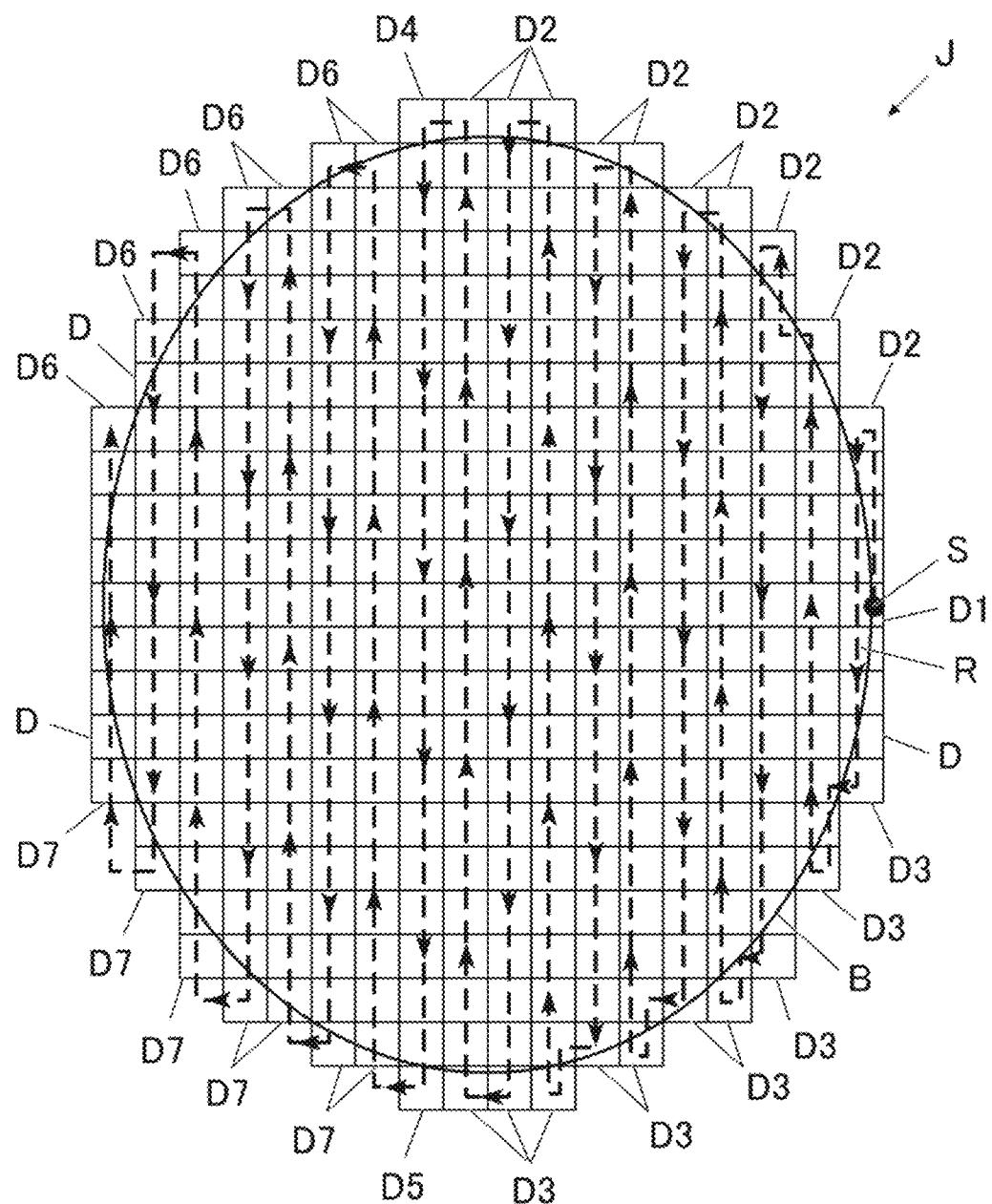
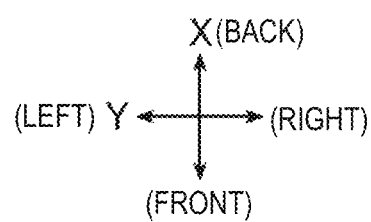

HAIR PLANTING APPARATUS

CROSS-REFERENCE TO RELATED APPLICATIONS

The present application claims the benefit of priority of Japanese Patent Application No. 2022-044917, filed on Mar. 22, 2022, the content of which is incorporated herein by reference.

TECHNICAL FIELD

The present disclosure relates to a hair planting apparatus.

BACKGROUND ART

The related hair planting apparatus holds a mesh-like base material for hair planting, and uses a plurality of hook needles to form a knot of hair for planting into individual mesh holes of the base material to perform hair planting (for example, see JP2018-040084A).

However, in the related hair planting apparatus described above, if the alignment direction of a plurality of mesh holes in the base material deviates from a specified direction, it is difficult to position the base material, and there is a risk of defective hair planting.

SUMMARY OF INVENTION

An object of the present disclosure is to properly perform an operation of planting hair on a base material.

A hair planting apparatus of the present disclosure including:
- a mounting portion for mounting a base material where planting is performed, and including a work opening for planting;
- a hair planting unit for binding hair for planting to the base material in the work opening of the mounting portion;
- a transport mechanism for positioning the hair planting unit relative to each mesh hole of the base material mounted on the mounting portion;
- an imaging unit for capturing images of a plurality of mesh holes of the base material mounted on the mounting portion;
- a correction mechanism for changing an orientation of the base material on the mounting portion with respect to the imaging unit;
- a tilt detection unit for obtaining, from the image captured by the imaging unit, an alignment direction of the plurality of mesh holes of the base material; and
- a correction control unit for correcting, by the correction mechanism, the orientation of the base material on the mounting portion according to a tilt angle of the alignment direction of the plurality of mesh holes of the base material with respect to a predetermined direction.

According to the present disclosure, with the above configuration, it is possible to properly perform an operation of planting hair on the base material.

BRIEF DESCRIPTION OF DRAWINGS

FIG. 16 is a front view showing a schematic configuration of a hair planting apparatus equipped with another correction mechanism;

FIG. 18 is a plan view of a base material;

DESCRIPTION OF EMBODIMENTS

Overall Configuration of Embodiment of Present Disclosure

A hair planting apparatus 10 according to an embodiment of the present disclosure will be described in detail below with reference to the drawings.

Figure 1:
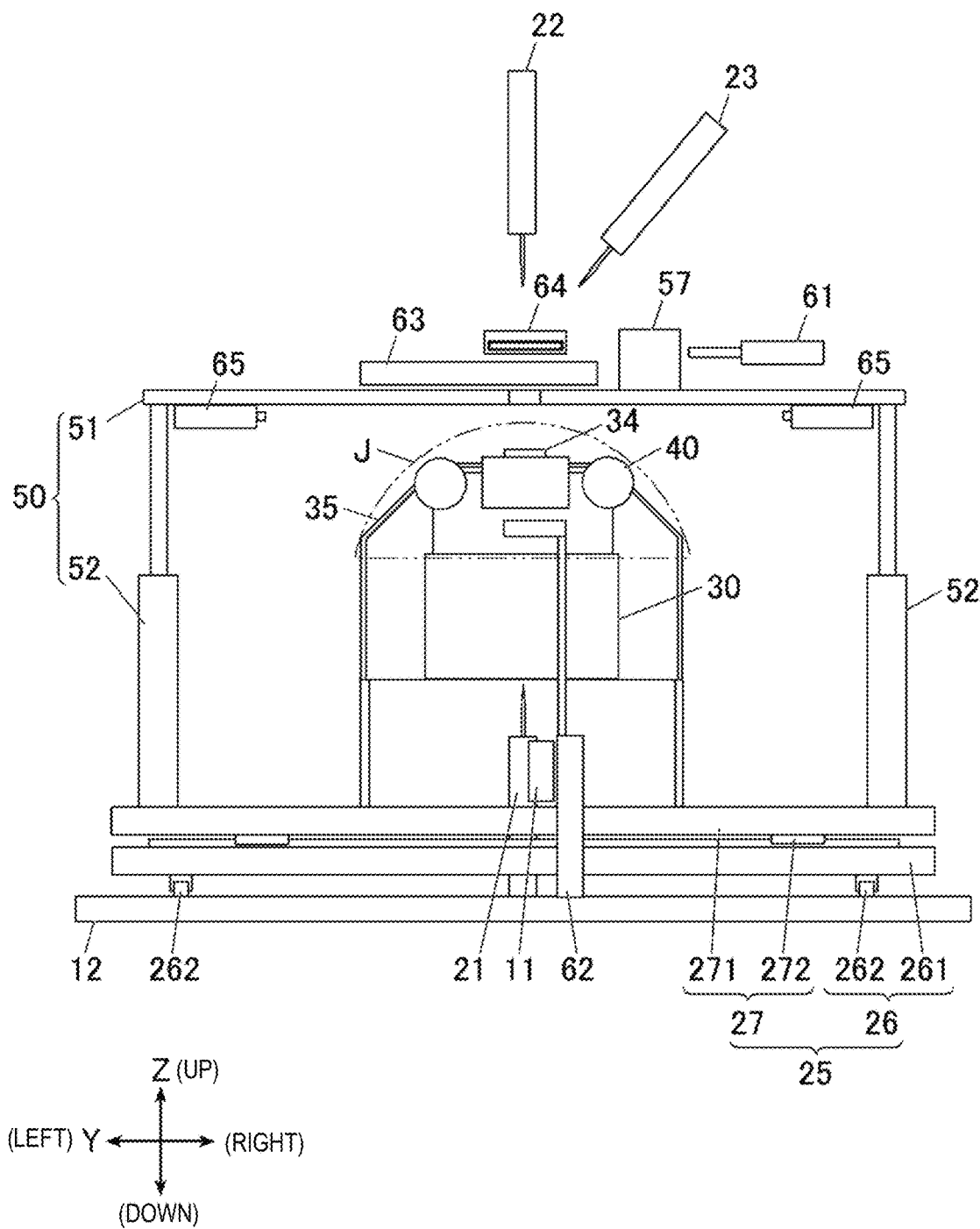
FIG. 1 is a front view showing a schematic configuration of a hair planting apparatus according to an embodiment of the present disclosure.
Figure 2:
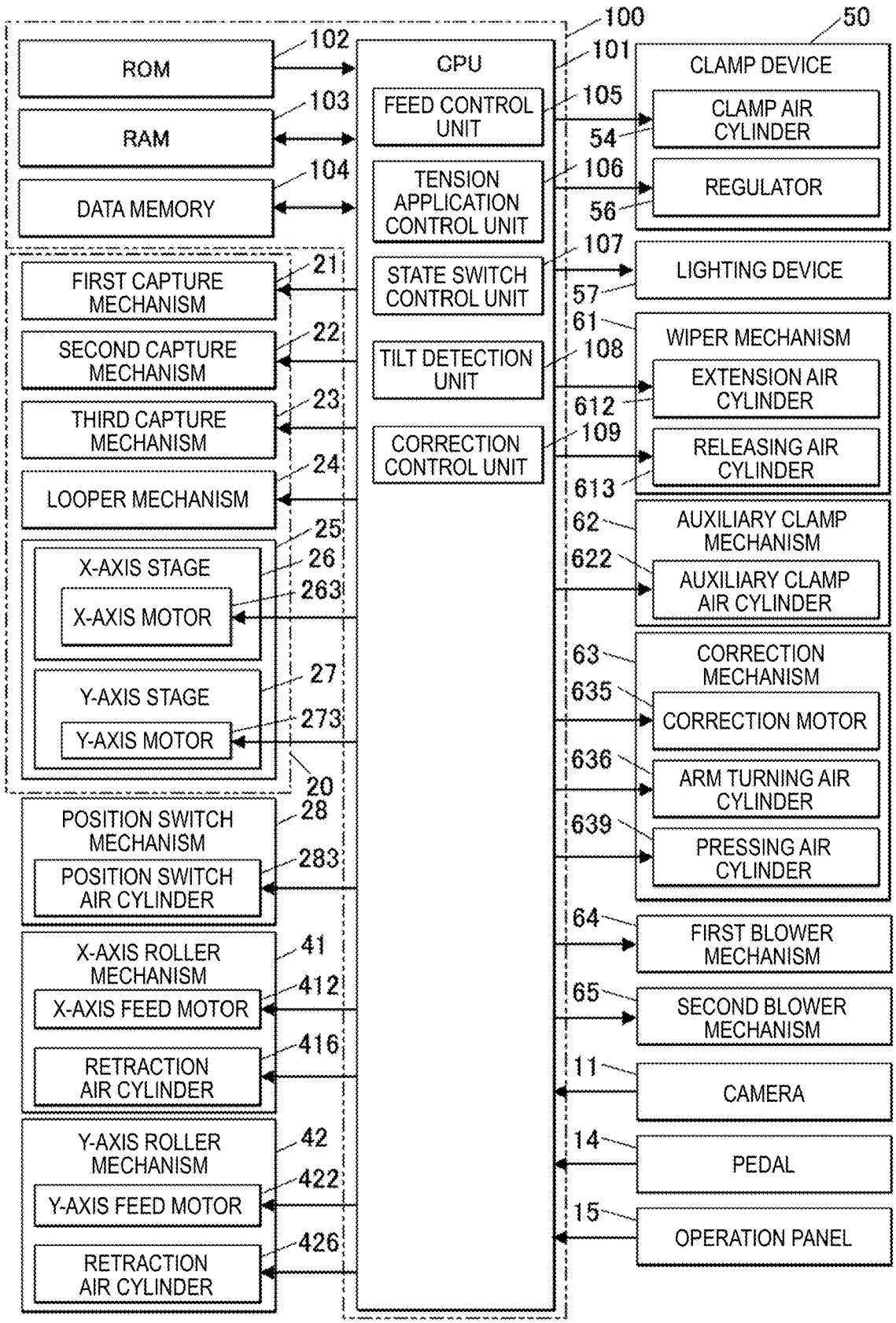
FIG. 2 is a block diagram showing a control system of the hair planting apparatus.
Figure 3:
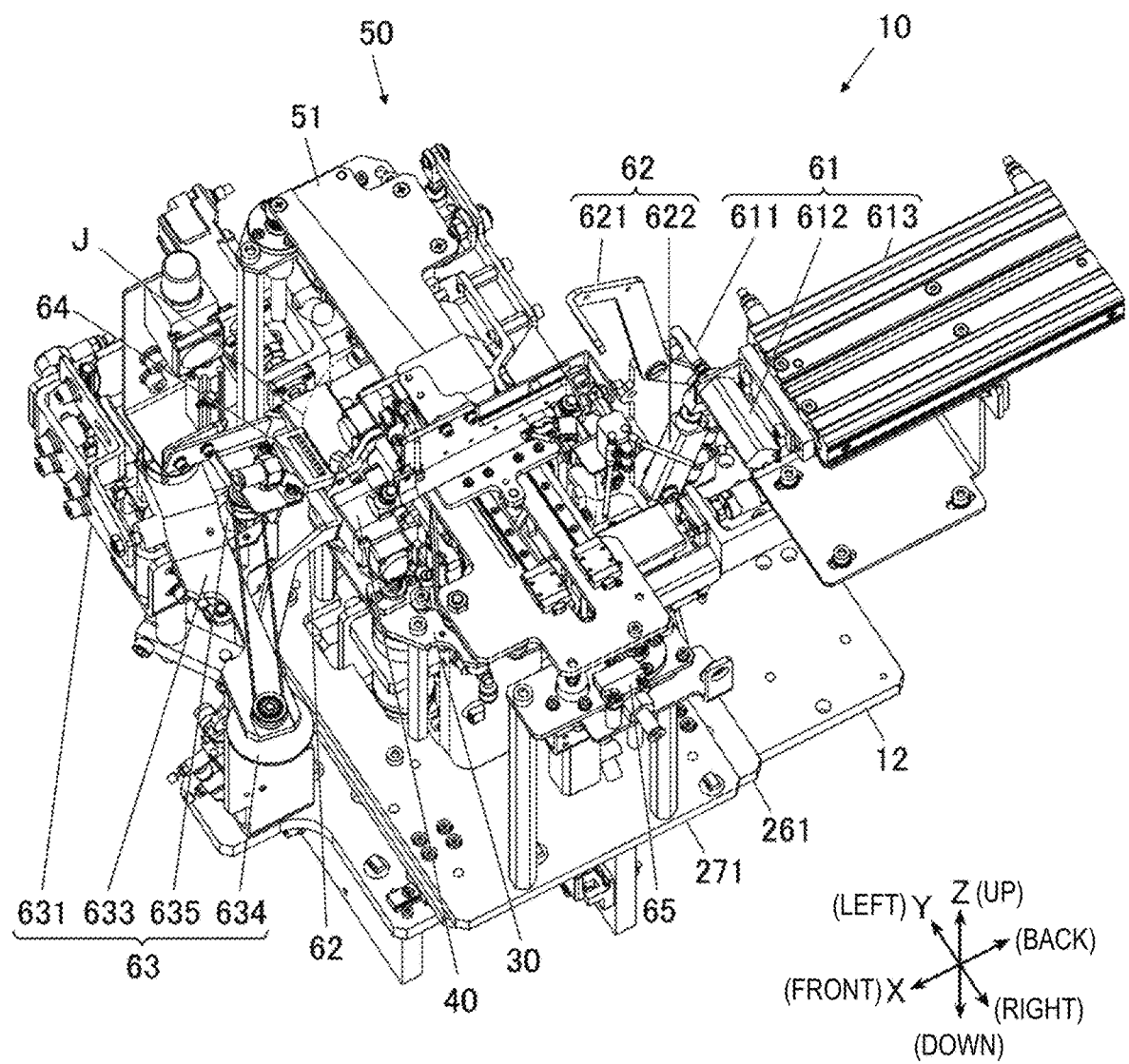
FIG. 3 is a perspective view of the hair planting apparatus.
Figure 4:
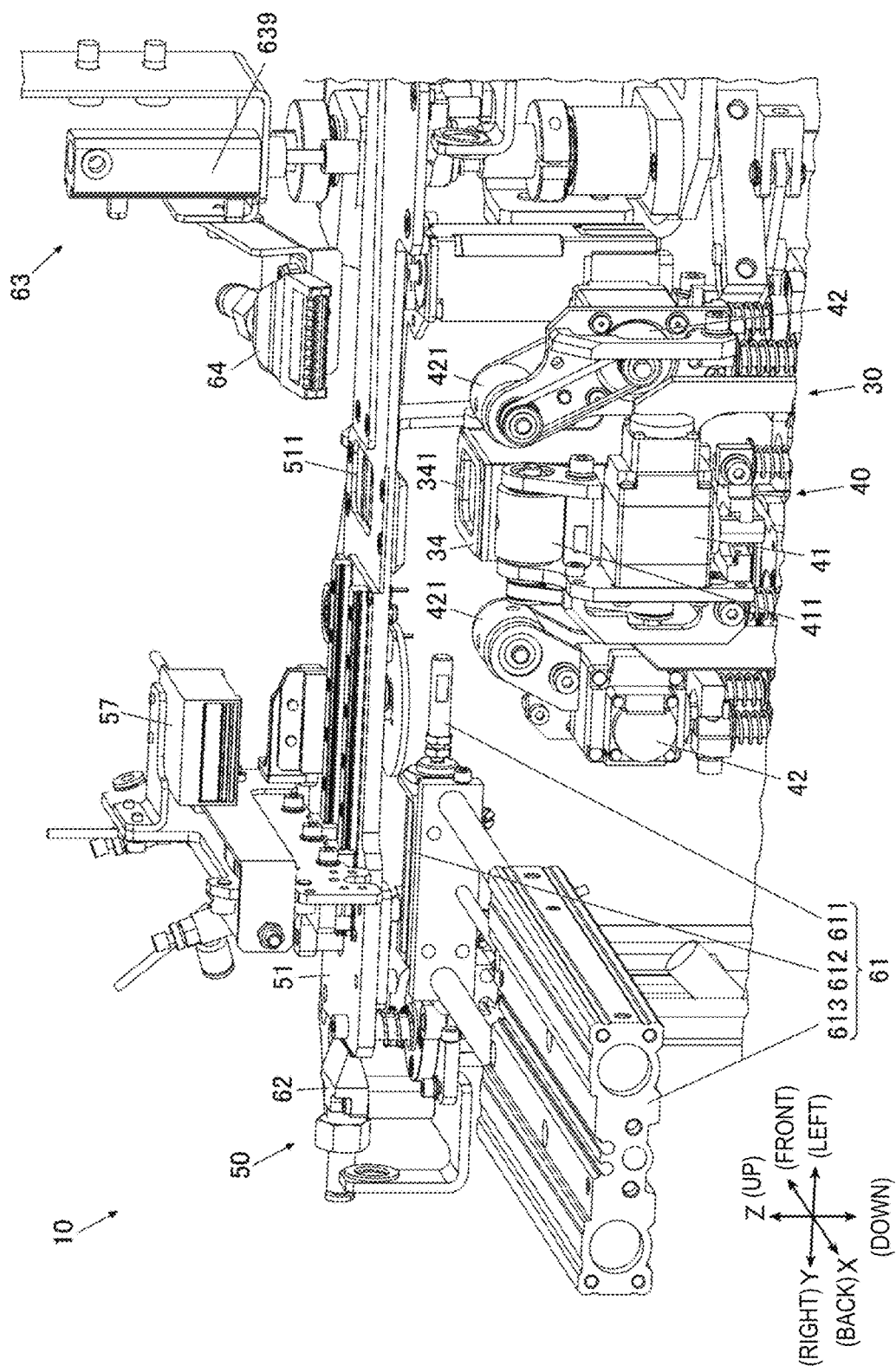
FIG. 4 is another perspective view of the hair planting apparatus.
Figure 5:
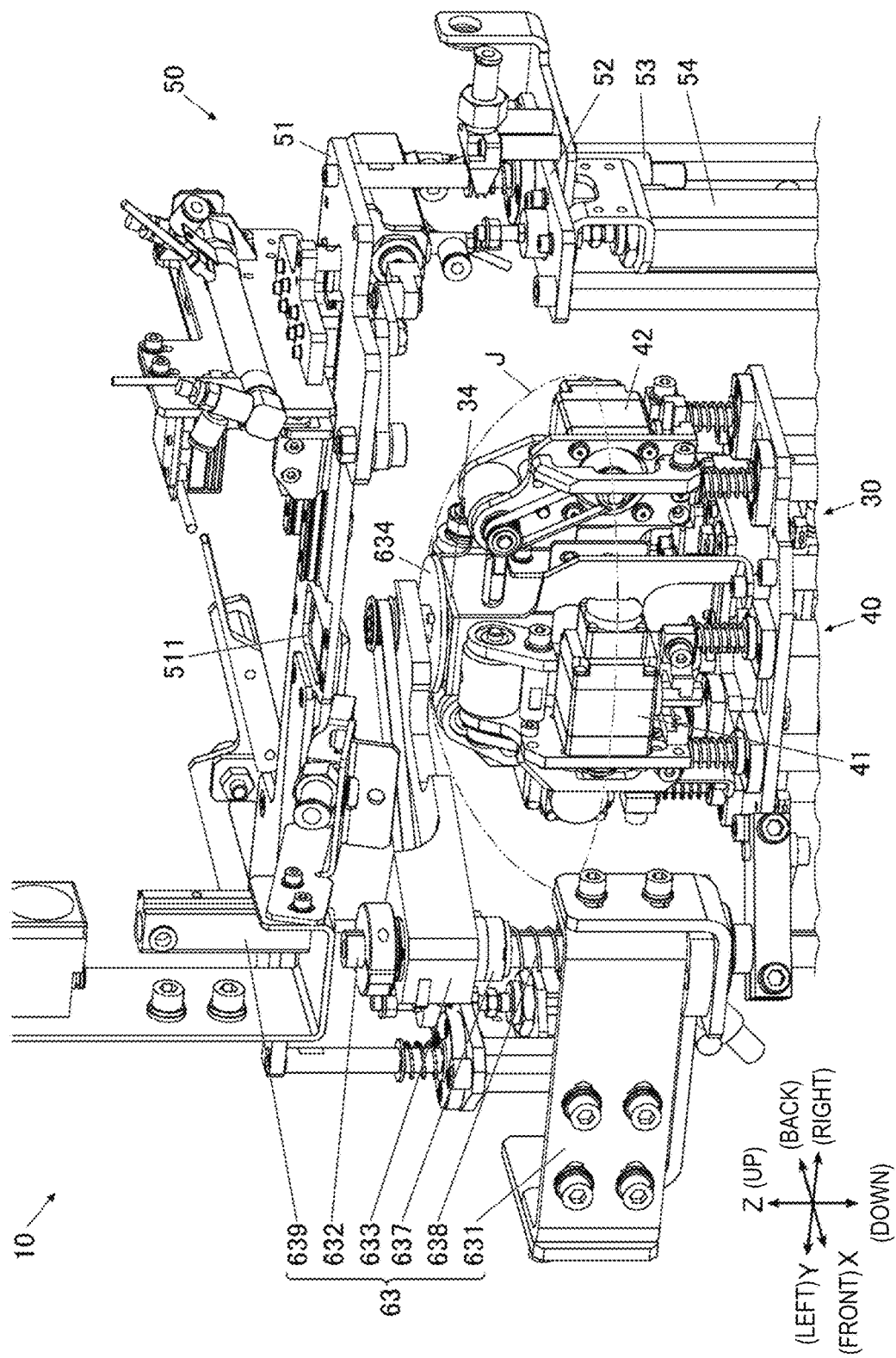
FIG. 5 is still another perspective view of the hair planting apparatus.

FIG. 1 is a front view illustrating a schematic configuration of the hair planting apparatus 10, FIG. 2 is a block diagram illustrating a control system of the hair planting apparatus 10, and FIGS. 3 to 5 are perspective views of the hair planting apparatus 10 seen from different directions respectively.

The hair planting apparatus 10 reduces workload and smoothly plants a hair for planting in a base material J.

The hair for planting is not limited to human hair and includes all other fibers similar to human hair, including natural fibers and artificial fibers.

The base material J is not limited to fibrous materials and includes any planar or curved sheet-shaped material, although in the present embodiment, an example of a curved (substantially spherical shell-shaped) sheet that imitates the shape of the top of a human head and that has hexagonal grid-like mesh holes is illustrated. The shape of the mesh hole may not be hexagonal.

As illustrated, the hair planting apparatus 10 includes a base stage 30 on which the base material J is mounted, a feed device 40 that feeds the mounted base material J in one direction (X-axis direction) on its mounting surface and another direction (Y-axis direction) orthogonal to the one direction, a clamp device 50 that holds the base material J mounted on the base stage 30 from above, a first capture mechanism 21 that pulls a hair for planting through a mesh hole on a back side (lower side) of the held base material J to form a small loop, a looper mechanism 24 that expands a small loop (see FIGS. 6 and 7), a second capture mechanism 22 that pulls the loop on the back side of the hair for planting from a neighboring mesh hole to a surface side (upper side) of the base material J, a third capture mechanism 23 that pulls one end of the hair for planting into the loop on the surface side of the hair for planting to form a knot, and a transport mechanism 25 that performs a relative transport operation of the held base material J and hook needles of the first to third capture mechanisms 21 to 23.

Further, the hair planting apparatus 10 includes a camera 11 serving as an imaging unit that captures an image of the mounted base material J, a position switch mechanism 28 that holds the camera 11 and the first capture mechanism 21 and switches the positions thereof, a wiper mechanism 61 that wipes away to the outside of an upper opening 511 the planted hair for planting inserted in the upper opening 511 of a clamp plate 51 to be described below, an auxiliary clamp mechanism 62 that holds the base material J mounted on the base stage 30 in an auxiliary manner, a correction mechanism 63 for correcting the orientation of the base material J on the base stage 30, a first blower mechanism 64 that blows air to orient the hair for planting planted in the base material J in a predetermined direction, a second blower mechanism 65 that blows air to push the base material J to the base stage 30 side, a control device 100 that controls operations of each configuration described above, and a base 12 that directly or indirectly supports each configuration described above.

In the following description, the mounting surface on which the base material J is mounted is horizontal, and one side in the Y-axis direction parallel to the mounting surface is referred to as the "left" side and the other side is referred to as the "right" side, while one side in the X-axis direction parallel to the mounting surface is referred to as the "front" side (side close to the paper surface in FIG. 1) and the other side is referred to as the "rear" side (side far from the paper surface in FIG. 1). Further, the vertical up-and-down direction orthogonal to the X-axis direction and the Y-axis direction is referred to as a Z-axis direction, and one side in the Z-axis direction is referred to as the "upper" side while the other side is referred to as the "lower" side.

Further, the first to third capture mechanisms 21 to 23 and the looper mechanism 24 form a hair planting unit 20 that binds the hair for planting to the base material J.

The configurations of the second and third capture mechanisms 22 and 23 and the looper mechanism 24 of the hair planting unit 20, the transport mechanism 25, and the operation of binding the hair for planting to the base material J by the hair planting unit 20 and the transport mechanism 25 are substantially the same as those disclosed in JP2018-040084A.

Reference is made to the present disclosure for detailed descriptions, which are therefore omitted herein.

[Base and Transport Mechanism]

As illustrated in FIG. 1, the base 12 is a flat plate body that directly or indirectly supports the entire configuration of the hair planting apparatus 10. An upper surface of the base 12 is horizontal in a state when the hair planting apparatus 10 is installed on the horizontal surface.

The first capture mechanism 21, the second capture mechanism 22, the position switch mechanism 28 supporting the third capture mechanism 23 and the camera 11, the looper mechanism 24, the wiper mechanism 61, the auxiliary clamp mechanism 62, the correction mechanism 63, and the first blower mechanism 64 described above are directly supported on the base 12.

When elements are said to be "directly supported," it means that the elements are installed without having any transport mechanism provided therebetween, and thus, not to be moved in position in plan view.

As illustrated in FIGS. 1 and 2, the transport mechanism 25 includes an X-axis stage 26 installed on the upper surface of the base 12 and a Y-axis stage 27 installed on the X-axis stage 26.

The X-axis stage 26 includes a stage plate 261 having an upper surface parallel to the X-Y plane, a slide guide 262 slidably supporting the stage plate 261 in the X-axis direction with respect to the base 12, and a linear transport mechanism (not shown) that allows any transport and positioning of the stage plate 261 in the X-axis direction. The linear transport mechanism includes a ball screw mechanism, and an X-axis motor 263 including a servomotor which serves as a drive source of the ball screw mechanism.

The Y-axis stage 27 includes a stage plate 271 having an upper surface parallel to the X-Y plane, a slide guide 272 slidably supporting the stage plate 271 in the Y-axis direction with respect to the stage plate 261 of the X-axis stage 26, and a linear transport mechanism (not shown) that allows any transport and positioning of the stage plate 271 in the Y-axis direction. The linear transport mechanism includes a ball screw mechanism, and a Y-axis motor 273 including a servomotor which serves as a drive source of the ball screw mechanism.

The base stage 30, the feed device 40, the clamp device 50, and the second blower mechanism 65 are directly supported on the stage plate 271 of the Y-axis stage 27.

The transport mechanism 25 can position the base material J on the base stage 30 at any position in the X-Y plane by the cooperation between the X-axis stage 26 and the Y-axis stage 27.

The linear transport mechanism of the X-axis stage 26 and Y-axis stage 27 is not limited to the ball screw mechanism and may be any mechanism that can position the stage plate 261 or 271 anywhere in the X-axis direction or the Y-axis direction. For example, the linear transport of the stage plate 261 or 271 may be implemented by a configuration of a pinion-rack mechanism and a servomotor, or the stage plate 261 or 271 may be linearly transported by a linear motor.

[Base Stage]

Figure 6:
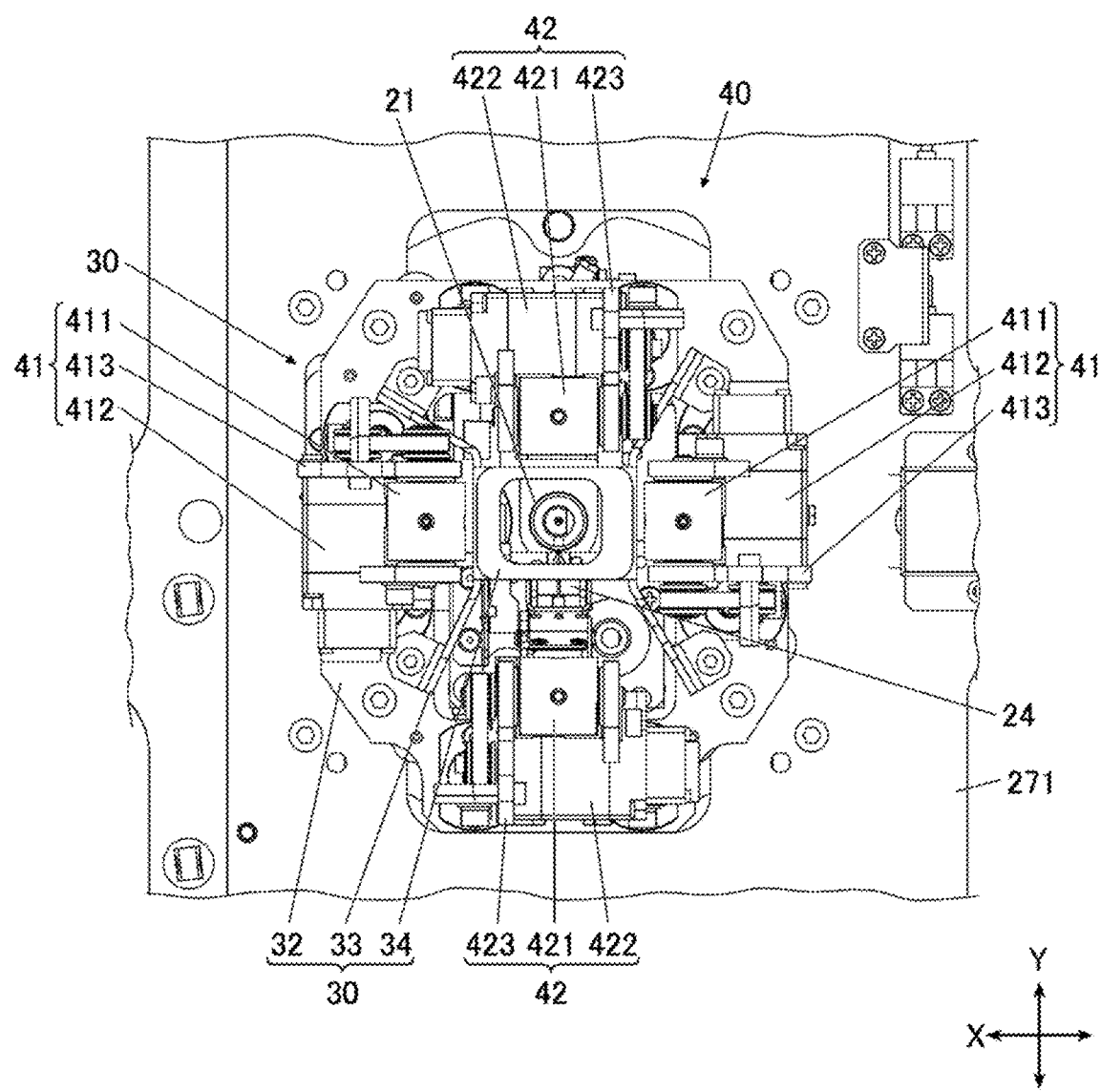
FIG. 6 is a plan view of a base stage.
Figure 7:
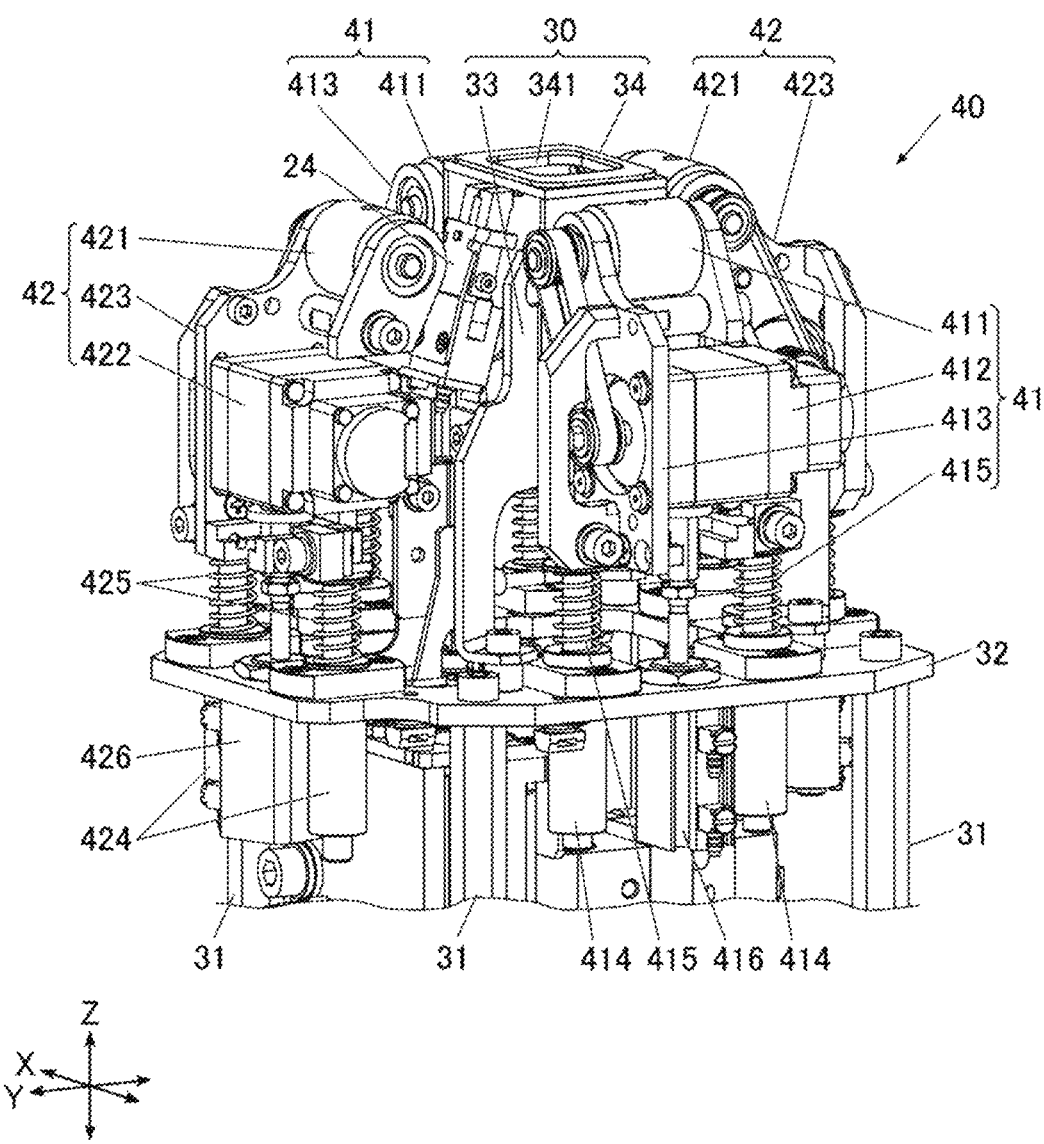
FIG. 7 is a perspective view of the base stage.

FIG. 6 is a plan view of the base stage 30, and FIG. 7 is a perspective view.

As illustrated, the base stage 30 includes a base plate 32 supported by four posts 31 (one is not shown in the drawing) erected on the Y-axis stage 27 of the transport mechanism 25, a tower-like erected part 33 provided on the upper surface of the base plate 32, and a mounting plate 34 serving as a mounting portion provided at an upper end of the erected part 33.

The erected part 33 is erected at a center portion of the base plate 32 in the plan view.

The mounting plate 34 provided at the upper end of the erected part 33 is a substantially rectangular frame-like body, and includes a work opening 341 in a substantially rectangular shape formed in the center portion. Further, an upper surface of the mounting plate 34 is a mounting surface parallel to the X-Y plane.

During the hair planting operation, the base material J is mounted on the mounting surface which is the upper surface of the mounting plate 34. The mounting plate 34 is smaller than the base material J, and the base material J is mounted with the lower surface portion thereof being in partial contact with the mounting plate 34. When the binding operation of the hair for planting to the base material J is performed, it is necessary to insert a hook needle of the first capture mechanism 21 from the lower side of the base material J into the mesh hole, but the insertion of the hook needle is performed through the work opening 341 of the mounting plate 34. Further, the operation of binding the hair for planting by the second and third capture mechanisms 22 and 23 is also performed within the range of the work opening 341 of the mounting plate 34.

[Feed Device]

As illustrated in FIGS. 6 and 7, the feed device 40 includes, on the base plate 32 of the base stage 30, a pair of X-axis roller mechanisms 41, 41 disposed on both sides of the mounting plate 34 in the X-axis direction in a plan view, and a pair of Y-axis roller mechanisms 42, 42 disposed on both sides of the mounting plate 34 in the Y-axis direction in a plan view.

Each of the X-axis roller mechanisms 41 includes a roller 411 contacting from below the base material J mounted on the mounting surface of the mounting plate 34, an X-axis feed motor 412 serving as a rotational drive source of the roller 411, a support bracket 413 supporting the roller 411 and the X-axis feed motor 412, two slide guides 414 movably supporting the support bracket 413 on the base plate 32 up and down in the Z-axis direction, two coil springs 415 serving as elastic members to urge the support bracket 413 upward, and a retraction air cylinder 416 pulling the support bracket 413 downward against the coil springs 415.

The X-axis feed motor 412 supported by the support bracket 413 imparts a feed rotation from an output shaft to a rotating shaft of the roller 411, by a transmission mechanism including a pulley and a timing belt. The output shaft of the X-axis feed motor 412 and the rotating shaft of the roller 411 are both disposed in the Y-axis direction. Therefore, when the roller 411 performs rotational driving in contact with the base material J from below, mounted on the mounting surface of the mounting plate 34, the base material J can be fed in the X-axis direction.

Each of the Y-axis roller mechanisms 42 includes a roller 421 contacting the base material J from below, mounted on the mounting surface of the mounting plate 34, a Y-axis feed motor 422 serving as a rotational drive source of the roller 421, a support bracket 423 supporting the roller 421 and the Y-axis feed motor 422, a slide guide 424 movably supporting the support bracket 423 on the base plate 32 up and down in the Z-axis direction, coil springs 425 serving as elastic members to urge the support bracket 423 upward, and a retraction air cylinder 426 pulling the support bracket 423 downward against the coil springs 425.

The Y-axis feed motor 422 supported by the support bracket 423 imparts the feed rotation from the output shaft to the rotating shaft of the roller 421, by a transmission mechanism including a pulley and a timing belt. The output shaft of the Y-axis feed motor 422 and the rotating shaft of the roller 421 are both disposed in the X-axis direction. Therefore, when the roller 421 performs rotational driving in contact with the base material J from below, mounted on the mounting surface of the mounting plate 34, the base material J can be fed in the Y-axis direction.

When the retraction air cylinders 416 and 426 are not pulling the support brackets 413 and 423 downward and the coil springs 415 and 425 are urging the support brackets 413 and 423 to the top position, the height of the upper ends of the respective rollers 411 and 421 is respectively set so as to match the height of the mounting surface (upper surface) of the mounting plate 34 or be slightly lower than the mounting surface of the mounting plate 34. The respective rollers 411 and 421 at this height are at a "feed position" respectively.

In contrast, when the retraction air cylinders 416 and 426 are pulling the support brackets 413 and 423 downward, the height of the upper ends of the respective rollers 411 and 421 is respectively lowered to a height at which the lower surface of the base material J mounted on the mounting plate 34 is not reached and feed operation cannot be performed. The respective rollers 411 and 421 at this height are at a "retraction position" respectively.

When the pair of X-axis roller mechanisms 41 is set at the feed position, and the pair of Y-axis roller mechanisms 42 is set at the retraction position, and the rollers 411 of the pair of X-axis roller mechanisms 41 are driven to rotate in the same direction, a transport force in the X-axis direction can be imparted to the base material J from both sides of the mounting plate 34.

Further, when the pair of Y-axis roller mechanisms 42 is set at the feed position, and the pair of X-axis roller mechanisms 41 is set at the retraction position, and the rollers 421 of the pair of Y-axis roller mechanisms 42 are driven to rotate in the same direction, a transport force in the Y-axis direction can be imparted to the base material J from both sides of the mounting plate 34.

Thus, the X-axis roller mechanisms 41 and the Y-axis roller mechanisms 42 perform the transport in the X-axis direction and the transport in the Y-axis direction separately rather than simultaneously.

Further, when the rollers 411 of the pair of X-axis roller mechanisms 41 at the feed position are driven to rotate reversely in a direction of separating the base material J apart, the tension in the X-axis direction is imparted to the base material J on the mounting plate 34 such that slack can be suppressed.

Further, when the rollers 421 of the pair of Y-axis roller mechanisms 42 at the feed position are driven to rotate reversely in a direction of separating the base material J apart, the tension in the Y-axis direction is imparted to the base material J on the mounting plate 34 such that slack can be suppressed.

Hereinafter, the operation control of imparting tension to the base material J in each direction by the pair of X-axis roller mechanisms 41 or the pair of Y-axis roller mechanisms 42 is referred to as "tension imparting control".

During the hair planting operation of binding the hair for planting to the base material J, the transport mechanism 25 described above is used for transporting the base material J together with the mounting plate 34, and positioning each mesh hole of the base material J in the range of the work opening 341 with respect to the hook needles of the first to third capture mechanisms 21 to 23.

In contrast, the feed device 40 is used for transporting the base material J with respect to the mounting plate 34 and shifting the range of the base material J facing the work opening 341 of the mounting plate 34 to another position in the base material J.

Therefore, the transport of the base material J by the transport mechanism 25 is finely controlled by a very small amount of transport compared with the transport of the base material J by the feed device 40.

While the configuration in which the roller mechanisms 41 and 42 in two intersecting directions respectively perform the feed in the X-axis direction and the Y-axis direction orthogonal to each other is illustrated herein, aspects are not limited thereto, and the configuration in which the feed is performed in two diagonally intersecting directions is also possible.

The base stage 30 includes a cover member 35 covering the base stage 30 and the feed device 40. The cover member 35 has a substantially convex polyhedron shape with an upper end thereof protruding upward, and the center of the upper end is widely notched such that the upper portions of the rollers 411 and 421 and the mounting plate 34 are respectively exposed upward therethrough. The upper end of the base stage 30 may have a polyhedral shape similar to a spherical shell or may have a substantially spherical shell shape.

With the presence of the cover member 35, the base material J mounted on the mounting plate 34 is prevented from a direct contact with the configurations other than the respective rollers 411 and 421 of the feed device 40 or with the corners of the base plate 32, allowing a smooth feed operation of the base material J by the feed device 40.

The cover member 35 is omitted in drawings other than FIG. 1.

[Clamp Device]

As illustrated in FIG. 1 and FIGS. 3 to 5, the clamp device 50 includes a clamp plate (clamp member) 51 including a flat plate body elongated in the Y-axis direction above the base stage 30, a pair of support bases 52 erected on the upper surface of the stage plate 271 of the Y-axis stage 27 to individually support both ends of the clamp plate 51, a slide guide 53 that allows lifting and lowering of the clamp plate 51 with respect to each support base 52, a clamp air cylinder 54 serving as an elevating part that lifts and lowers the clamp plate 51, and a coil spring 55 provided between each support base 52 and the clamp plate 51 and serving as an elastic member urging the clamp plate 51 upward.

Since the clamp device 50 is supported on the stage plate 271 of the Y-axis stage 27, the transport mechanism 25 transports the clamp device 50 together with the base stage 30 in the X-Y plane.

The clamp plate 51 is directly above the work opening 341 of the mounting plate 34 and has an upper opening 511 in substantially the same shape and size as the work opening 341, extending in the up-and-down direction.

The lower surface of the clamp plate 51 can be brought into contact with the mounting surface of the mounting plate 34 at a lower limit position of the lifting and lowering operation. The clamp plate 51 can be lowered to the lower limit position and clamp the base material J mounted on the mounting plate 34 from above to fixedly hold the base material J.

Furthermore, at the lower limit position of the lifting operation, the work opening 341 and the upper opening 511 of the mounting plate 34 can be overlapped at substantially the same position in the plan view.

The second and third capture mechanisms 22 and 23 described above are disposed above the clamp plate 51, and extend the hook needles downward to perform the operations of binding the hair for planting within the range of the work opening 341 of the base material J through the upper opening 511.

Further, four contact plates 512 individually contacting the outer circumference of the respective rollers 411 and 421 are provided on four sides of the upper opening 511 on the lower surface side of the clamp plate 51. The lower surface of each contact plate 512 is positioned lower than the lower surface of the clamp plate 51 and contacts the upper portions of the respective rollers 411 and 421 at a position short of the lower limit position of the lifting and lowering operation of the clamp plate 51. Thus, it is possible to make the base material J on the mounting plate 34 properly contact the respective rollers 411 and 421 by lowering the clamp plate 51 to a position short of the lower limit position, and ensure that the feed operation by the pair of X-axis roller mechanisms 41 and the pair of Y-axis roller mechanisms 42 can be performed properly.

Figure 8:
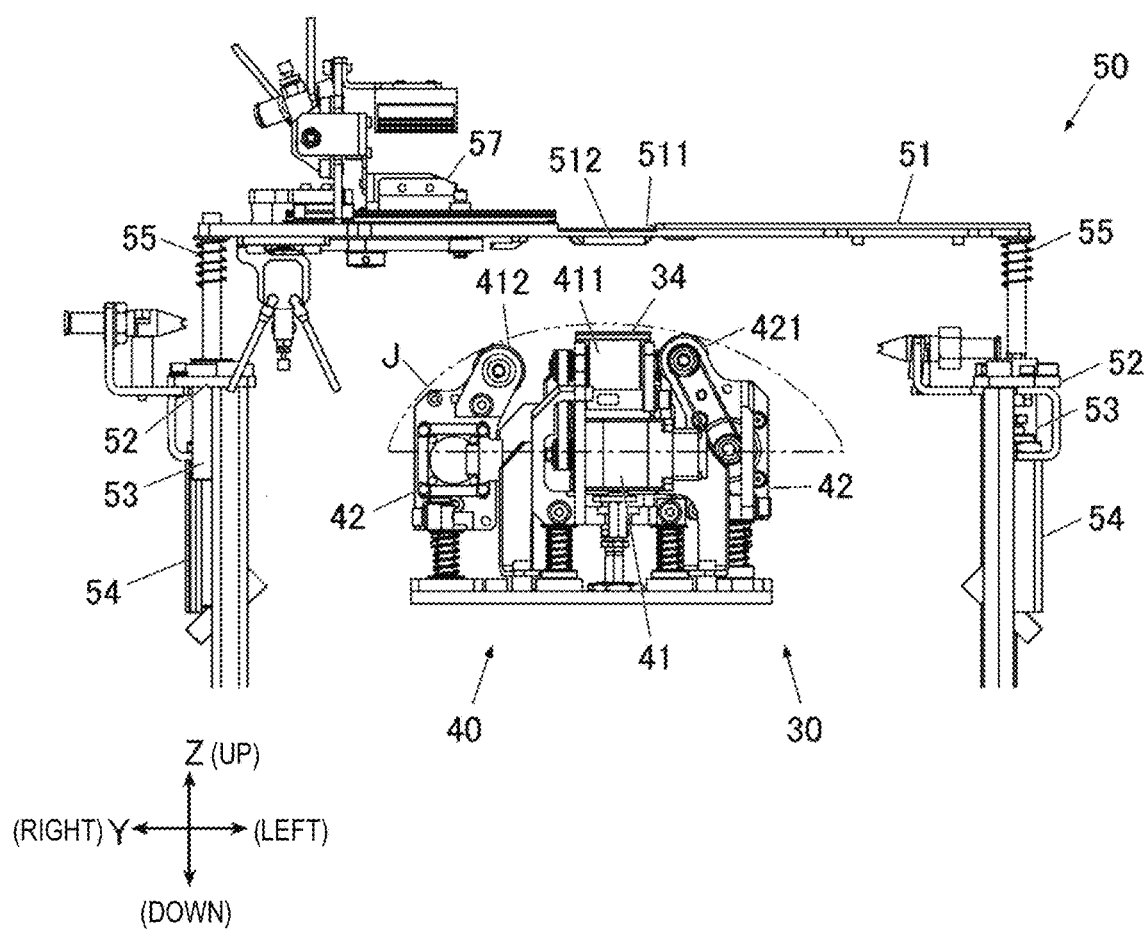
FIG. 8 is a front view of a clamp device with a clamp plate in a lifted position.
Figure 9:
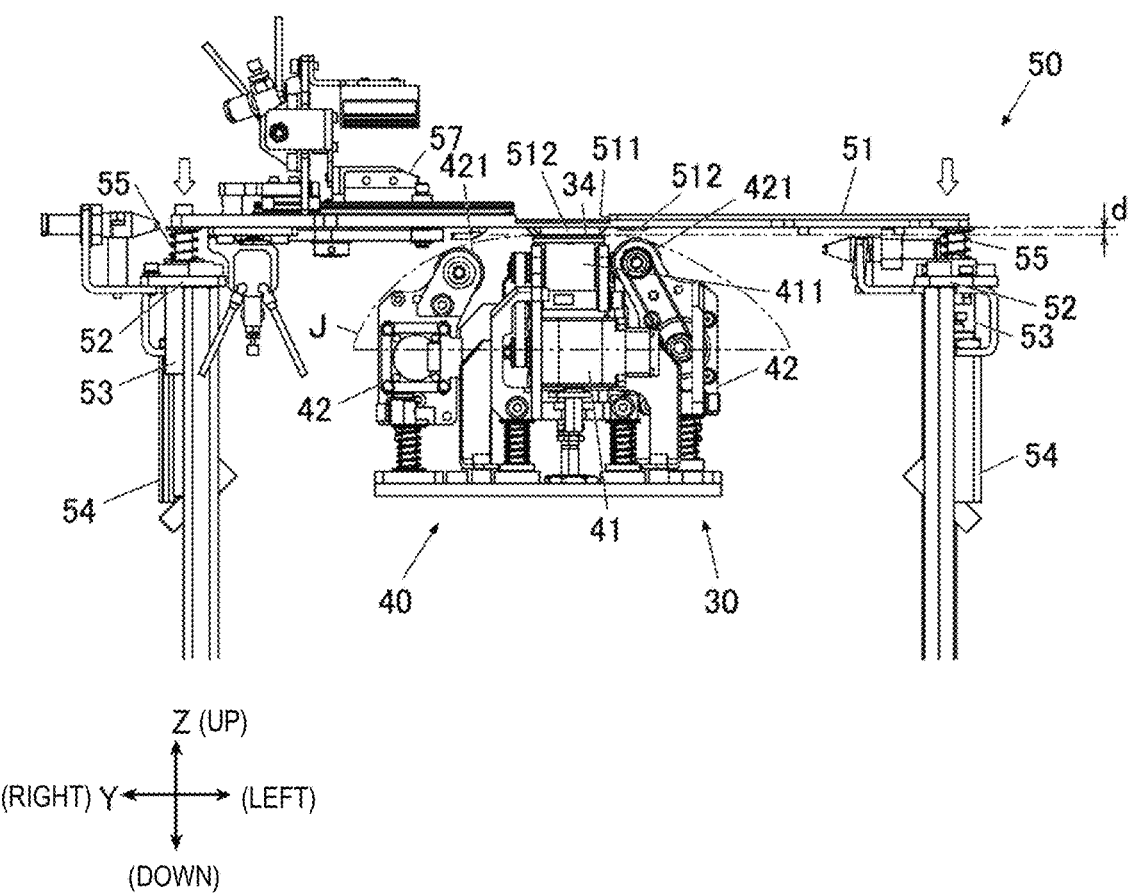
FIG. 9 is a front view of the clamp device with the clamp plate in a weak clamp position.
Figure 10:
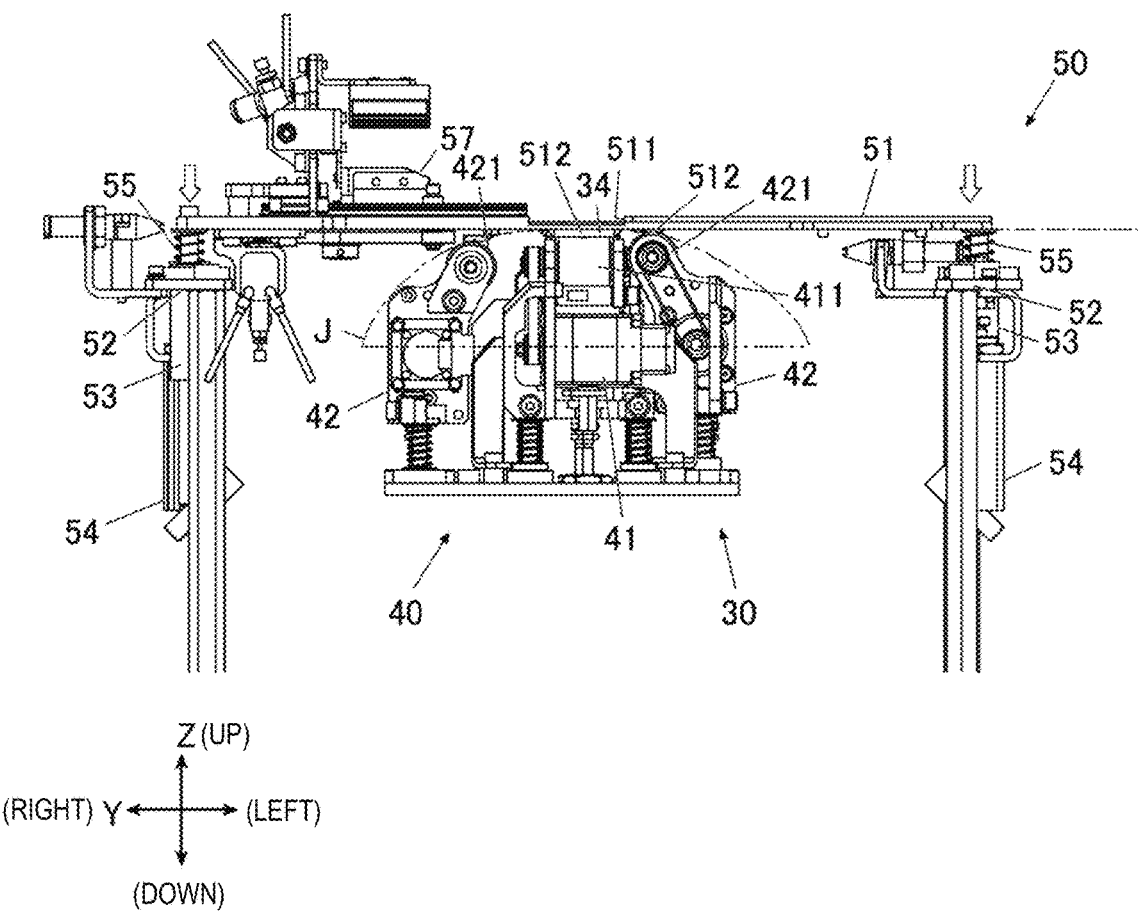
FIG. 10 is a front view of the clamp device with the clamp plate in a strong clamp position.

FIGS. 8 to 10 are front views of the clamp device 50 with the clamp plate 51 at different heights respectively.

FIG. 8 illustrates the clamp plate 51 positioned at a lifted position, which is the upper limit of the lifting and lowering operation, by the upward pressure of each clamp air cylinder 54. In this state, the lower surface of the clamp plate 51 is separated far away from the mounting surface of the mounting plate 34.

At the lifted position, the base material J on the mounting plate 34 is in the unclamped state. Since the clamp plate 51 at the lifted position is separated far away from the mounting plate 34, the hair for planting can be swept through a wiper member 611 of the wiper mechanism 61 to be described below.

Each clamp air cylinder 54 is provided with a regulator 56 in the supply path from the pneumatic source, and air pressure for lowering the clamp plate 51 can be applied to each clamp air cylinder 54 in two stages, high and low, by the control of the control device 100.

FIG. 9 illustrates the clamp plate 51 when the downward pressure of each clamp air cylinder 54 is low, and FIG. 10 illustrates the clamp plate 51 when the downward pressure of each clamp air cylinder 54 is high.

As illustrated in FIG. 9, when the downward pressure of each clamp air cylinder 54 is low, the lowered clamp plate 51 cannot withstand the upward urging force received from the coil springs 55 such that a gap d is formed between the lower surface of the clamp plate 51 and the mounting surface of the mounting plate 34, and the base material J is restrained by a small or no restraining force of the clamp. The height of the clamp plate 51 at this time is referred to as a weak clamp position.

On the other hand, at this weak clamp position, each contact plate 512 of the clamp plate 51 contacts the respective rollers 411 and 421 or forms a very narrow gap with respect to the respective rollers 411 and 421. Therefore, when the base material J is mounted on the mounting plate 34, the base material J is pressed by each contact plate 512 into contact with the respective rollers 411 and 421 with appropriate contact force such that the feed operation by the pair of X-axis roller mechanisms 41 or the pair of Y-axis roller mechanisms 42 can be performed properly.

In contrast, as illustrated in FIG. 10, when the downward pressure of each clamp air cylinder 54 is high, the clamp plate 51 can be lowered against the coil springs 55 such that the lower surface of the clamp plate 51 and the mounting surface of the mounting plate 34 can be brought into pressed contract state. Therefore, when the base material J is mounted on the mounting plate 34, the base material J is firmly gripped by the clamp plate 51 and the mounting plate 34 and fixedly held with a large restraining force. The height of the clamp plate 51 at this time is referred to as a strong clamp position.

Further, a lighting device 57 is provided on the upper surface of the mounting plate 34. The lighting device 57 irradiates illumination light from above the upper opening 511 when the camera 11, which will be described below, captures images of the base material J through the work opening 341 from below the mounting plate 34. The lighting device 57 is in a retracted position at one end side of the clamp plate 51 when no image is captured, and is moved directly above the upper opening 511 by an actuator (not shown) to perform illumination when the image is captured.

[Auxiliary Clamp Mechanism]

As illustrated in FIG. 3, the auxiliary clamp mechanisms 62 are provided on both sides of the base stage 30 in the X-axis direction. The two auxiliary clamp mechanisms 62 are disposed to face two X-axis roller mechanisms 41 individually.

Each of the auxiliary clamp mechanisms 62 includes an auxiliary clamp plate 621 which is tiltable, and an auxiliary clamp air cylinder 622 for tilting the auxiliary clamp plate 621.

The auxiliary clamp plate 621 is formed in a shape of a flat plate with a base end being tiltably supported about the Y-axis and a tip end contacting the outer circumferential surface of the roller 411 of the X-axis roller mechanism 41.

The auxiliary clamp air cylinder 622 imparts tilting force in a direction in which the tip end of the auxiliary clamp plate 621 contacts the outer circumferential surface of the roller 411. As a result, the base material J mounted on the mounting plate 34 is sandwiched and held in position between the X-axis roller mechanism 41 and the tip end of the auxiliary clamp plate 621.

For example, the two auxiliary clamp mechanisms 62 are provided to press the base material J so as to prevent misalignment between the base material J and the mounting plate 34, when the clamp plate 51 of the clamp device 50 is in the lifted position where the base material J of the mounting plate 34 is released from restraint.

When the base material J is clamped by the two auxiliary clamp mechanisms 62, the base material J is likely to loosen due to the pressing by the tip end of the auxiliary clamp plate 621. In view of this, it is preferable to simultaneously perform the control of applying tension by the pair of X-axis roller mechanisms 41 described above.

[Wiper Mechanism]

As illustrated in FIGS. 3 and 4, the wiper mechanism 61 is a mechanism for wiping away the hair for planting bound to the base material J.

As described above, the operation of planting hair on the base material J is performed through the work opening 341 and the upper opening 511 while the base material J is held by the clamp plate 51.

In this case, each hair for planting bound to the base material J protrudes upward of the clamp plate 51 through the upper opening 511.

On the other hand, when the planting of the hair for planting is completed in one section in the work opening 341 of the mounting plate 34 in the base material J, the clamp plate 51 is lifted to the weak clamp position and the feed device 40 performs the feed operation of the base material J such that an adjacent section is within the work opening 341.

Then, if each hair for planting in the planted state remains inserted in the upper opening 511, it may possibly affect the feed operation of the base material J, the binding operation of the hair for planting in the next section, the image capturing of a new section through the work opening 341, and the like.

Therefore, the clamp plate 51 is lifted to the lifted position, and the operation of wiping, with the wiper mechanism 61, the hair for planting bound to the base material J under the clamp plate 51 and wiping each hair for planting from the upper opening 511 is performed.

The operation of feeding the base material J and the operation of wiping the hair for planting may be performed in a switched order.

As illustrated in FIG. 3, the wiper mechanism 61 is disposed on a rear right side of the mounting plate 34 in the plan view. Further, the wiper mechanism 61 is disposed lower than the clamp plate 51 at the lifted position and higher than the mounting plate 34.

The wiper mechanism 61 includes a rod-shaped wiper member 611 for wiping each hair for planting, a telescopic air cylinder 612 extending and contracting the wiper member 611, and a wiping air cylinder 613 that imparts the wiper member 611 forward and backward movement for wiping.

The wiper member 611 is a round bar-shaped member formed in the Y-axis direction and extends leftward from the telescopic air cylinder 612.

The telescopic air cylinder 612 is supported by the wiping air cylinder 613 so that a plunger moving forward and backward is parallel to the Y-axis direction. The plunger of the telescopic air cylinder 612 is connected to the wiper member 611 in the extending direction thereof and can switch between contracting the wiper member 611 rightward and extending the wiper member 611 leftward.

In the contracting state, the wiper member 611 is positioned to the right of the mounting plate 34, and in the extending state, overlaps the mounting plate 34 in the Y-axis direction.

The wiping air cylinder 613 is supported by the base 12 so that the plunger is parallel to the X-axis direction. Then, it is possible to support the telescopic air cylinder 612 at the tip end of the plunger, and move the wiper member 611 forward of the mounting plate 34 when the plunger is advanced, and backward of the mounting plate 34 when the plunger is retracted.

With the above configuration, when binding the hair for planting to one section in the work opening 341 of the mounting plate 34 is completed and the clamp plate 51 is lifted to the lifted position, the wiper mechanism 61 advances the wiper member 611 by the wiping air cylinder 613, extends the wiper member 611 by the telescopic air cylinder 612, and then retracts the wiper member 611 by the wiping air cylinder 613.

As a result, the wiper member 611 can penetrate between the work opening 341 of the mounting plate 34 and the upper opening 511 of the clamp plate 51, mow off each hair for planting backward and wipe it away from the upper opening 511.

The wiper member 611 may take any form as long as the wiper member 611 can wipe away the hair for planting. For example, the wiper member 611 is not limited to a round bar shape and may take the shape of a plate or a brush.

[First Blower Mechanism]

The first blower mechanism 64 includes a nozzle connected to a pneumatic source. As illustrated in FIGS. 3 and 4, the first blower mechanism 64 is disposed forward of and slightly above the mounting plate 34 and blows air toward the mounting plate 34 to the rear obliquely downward.

As described above, the hair for planting collectively wiped backward by the wiper mechanism 61 tends to rise above the base material J from the state of being wiped backward due to the elasticity thereof. In this case, when clamping the base material J by the clamp device 50 for a new section, there is a concern that the hair for planting may be caught between the mounting plate 34 and the clamp plate 51.

For this reason, the first blower mechanism 64 blows air to the hair for planting wiped backward by the wiper mechanism 61 so that the hair does not rise.

[Second Blower Mechanism]

The second blower mechanism 65 includes a nozzle connected to a pneumatic source. As shown in FIG. 1, the second blower mechanism 65 is provided on one and the other ends of the clamp plate 51 in the Y-axis direction, and each of the second blower mechanisms 65 blows air toward the mounting plate 34 side under the clamp plate 51.

These second blower mechanisms 65 have a function of blowing air to press the base material J against the cover member 35 and the respective rollers 411 and 421, when the clamp plate 51 is lifted to release the base material J on the mounting plate 34 from restraint, and the like.

Further, the second blower mechanisms 65 have a function of blowing air toward the downstream side in the feed direction of the base material J to push the hair for planting to the downstream side in the feed direction of the base material J, when the feed device 40 feeds the base material J such that the adjacent section in the Y-axis direction is within the work opening 341 and the wiper mechanism 61 performs the wiping operation.

[Camera and Position Switch Mechanism]

Figure 11:
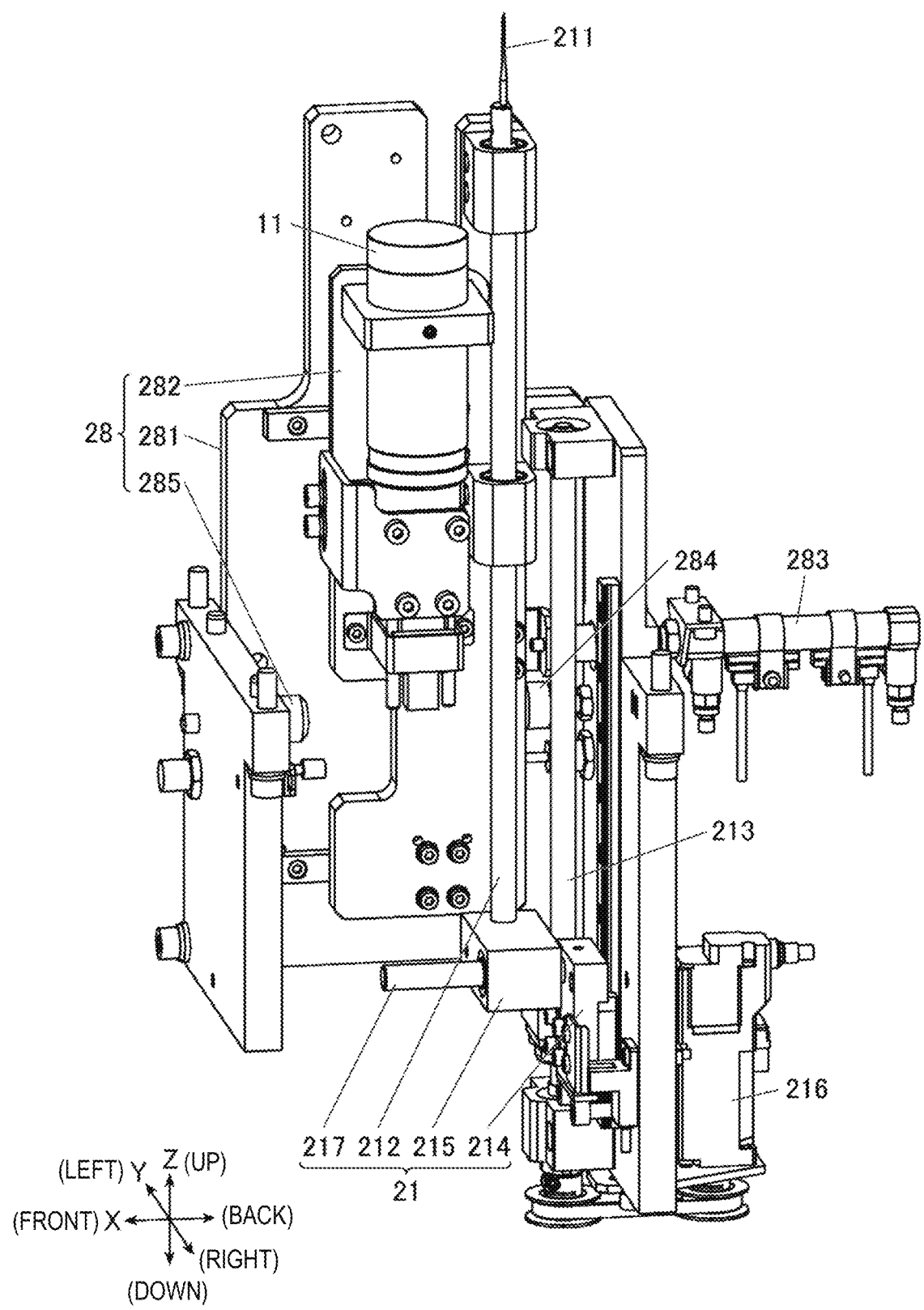
FIG. 11 is a perspective view of a camera, a first capture mechanism, and a position switch mechanism.
Figure 12A:
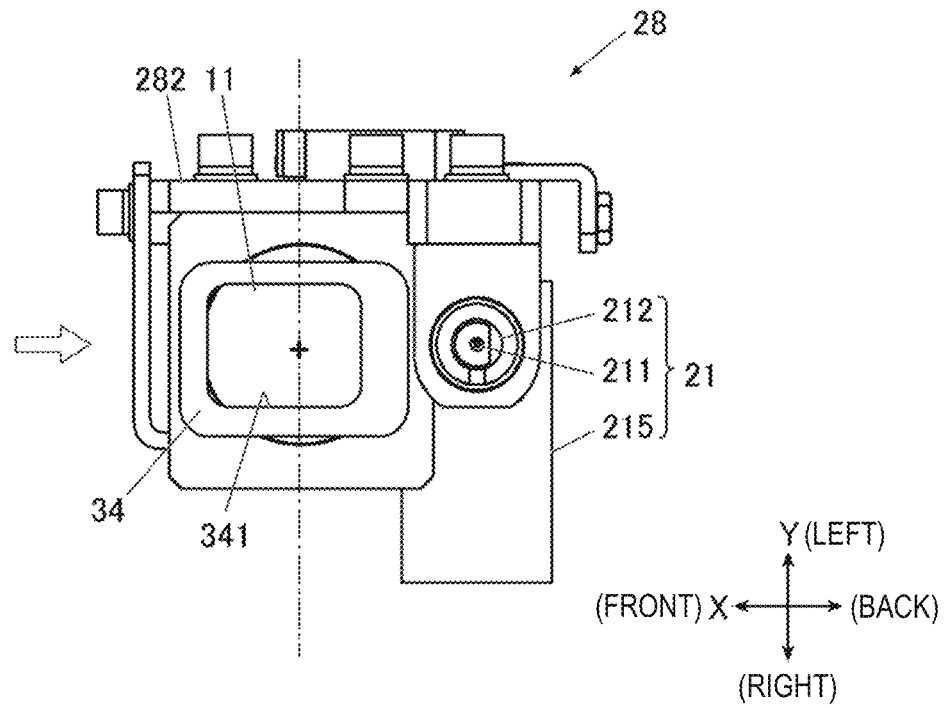
FIGS. 12A and 12B are plan views of the camera, the first capture mechanism, and the position switch mechanism.
Figure 12B:
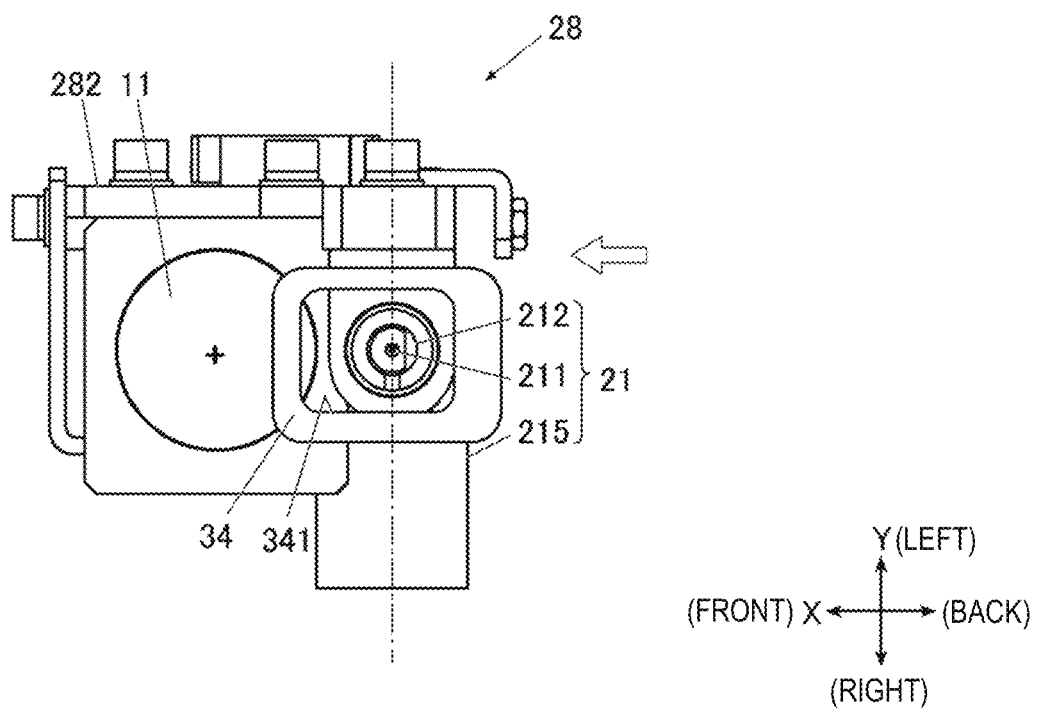

FIG. 11 is a perspective view of the camera 11, the first capture mechanism 21, and the position switch mechanism 28, and FIGS. 12A and 12B are plan views thereof.

The camera 11 captures images of the base material J from below the mounting plate 34 through the work opening 341. The camera 11 includes an image sensor such as a Charge-Coupled Device (CCD) or a Complementary Metal Oxide Semiconductor (CMOS) and an optical system.

The camera 11 is supported by the position switch mechanism 28 together with the first capture mechanism 21, and can be switched between a state in which the optical axis of the camera 11 is aligned with the center line along the Z-axis direction passing through the center of the work opening 341 and a state in which the center line of the hook needle held by the first capture mechanism 21 is aligned therewith.

The first capture mechanism 21 includes a hook needle 211 which is facing upward, a needle bar 212 holding the hook needle 211 at its upper end, a ball screw 213 along the Z-axis direction, a ball nut 214, a lifting block 215 that performs a lifting and lowering operation in conjunction with the ball nut 214, and a capture motor 216 that serves as a drive source for the lifting and lowering operation of the hook needle 211.

The ball screw 213 is supported by a support frame 281 of the position switch mechanism 28 so as to be rotatable around the Z axis.

The capture motor 216 imparts rotational force to the ball screw 213 by means of a belt mechanism.

The ball nut 214 is supported by the support frame 281 via a slide guide so as to be able to perform the lifting and lowering operation, and is moved up and down by the rotation of the ball screw 213.

The ball nut 214 includes an interlocking shaft 217 extending forward along the X-axis direction, and the lifting block 215 incorporates a linear bush into which the interlocking shaft 217 is inserted. In addition, the lifting block 215 holds the lower end of the needle bar 212 fixedly.

With this configuration, in the first capture mechanism 21, the ball screw 213 is rotated by driving of the capture motor 216, and the ball nut 214 is moved up and down along the ball screw 213.

The lifting block 215 is moved up and down together with the ball nut 214 by the interlocking shaft 217, and the needle bar 212 and the hook needle 211 are moved up and down.

At this time, the lifting block 215 can slide along the interlocking shaft 217 by means of the incorporated linear bushing, such that it can be moved up and down in conjunction with the ball nut 214 even when the needle bar 212 is moved forward.

The position switch mechanism 28 includes the support frame 281 fixedly installed on the base 12, a position switch plate 282 that supports the camera 11 and the needle bar 212, and a position switch air cylinder 283 that serves as a drive source for switching the positions of the camera 11 and the needle bar 212.

The support frame 281 supports the position switch plate 282 slidably along the X-axis direction by a slide guide.

The position switch plate 282 supports the camera 11 and the needle bar 212 side by side in the X-axis direction. Further, the position switch plate 282 supports the needle bar 212 by means of a linear bush so as to be moved up and down along the Z-axis direction.

The position switch air cylinder 283 is attached to the support frame 281 such that the plunger moves back and forth in the X-axis direction, and the tip end of the plunger is connected to the position switch plate 282.

The position switch mechanism 28 includes stoppers 284 and 285 that contact the position switch plate 282 that is slidable along the X axis from both sides in the X-axis direction.

The stopper 284 positions the position switch plate 282 such that the optical axis of the camera 11 supported by the position switch plate 282 coincides with the center of the work opening 341, as shown in FIG. 12A.

In addition, as shown in FIG. 12B, the stopper 285 positions the position switch plate 282 such that the center of the hook needle 211 of the needle bar 212 coincides with the center of the work opening 341.

In this way, the position switch mechanism 28 saves space by arranging the camera 11 and the first capture mechanism 21 in parallel in the X-axis direction, and also meets a need for positioning both the camera 11 and the first capture mechanism 21 at the same position within the work opening 341 in plan view.

In addition, as described above, the position switch mechanism 28 is installed directly on the base 12 and does not generate movement on the base 12. On the other hand, the mounting plate 34 is installed on the base 12 via the transport mechanism 25. Therefore, in plan view, the mounting plate 34 is relatively movable in the X-axis and the Y-axis directions with respect to the position switch mechanism 28. Therefore, "the center of the work opening 341" refers to the center of the work opening 341 in a state in which the mounting plate 34 is positioned at the center of the movable range of the transport mechanism (as the reference position of the mounting plate 34).

[Correction Mechanism]

The base material J is a mesh material developed with mesh holes aligned on its surface. For example, the base material J of this embodiment includes aligned hexagonal mesh holes. When the hair for planting is sequentially bound to each mesh hole of the base material J, the arrangement direction of the mesh holes is held on the mounting plate 34 so as to be parallel to the X-axis or Y-axis directions, which is the feed direction of the feed device 40.

However, the alignment direction of the mesh holes may be tilted due to a variety of factors, such as when displacement occurs due to slipping of the base material J during feeding, when the base material J is not flat but has a three-dimensional shape or is made of a soft material that is easily deformable, and the like.

The tilting of the mesh holes of the base material J can be detected from the image captured by the camera 11.

Then, when the tilting of the mesh holes of the base material J exceeds the allowable value, the orientation of the base material J on the base stage 30 can be corrected by rotating the camera 11 around the Z-axis by the correction mechanism 63.

The correction mechanism 63 is arranged in front of the mounting plate 34, as shown in FIGS. 3 to 5. Then, the correction mechanism 63 includes a support shaft 632 rotatably supported around the Z-axis by a bracket 631 installed on the base 12, an arm 633 fixed to the upper end of the support shaft 632, a disc-shaped pressing plate 634 provided at the tip end of the arm 633, a correction motor 635 (see FIG. 2) that rotates the pressing plate 634 via a belt mechanism, and an arm turning air cylinder 636 (see FIG. 2) that imparts rotational motion to the support shaft 632.

The support shaft 632 is supported along the Z-axis direction by the bracket 631.

The arm 633 is connected to the support shaft 632 via a spline nut 637. That is, the arm 633 can be moved along the support shaft 632 and rotated around the Z-axis together with the support shaft 632 by the spline nut 637.

In addition, the arm 633 is pressed upward by an elastic member, that is, by a coil spring 638 via the spline nut 637.

The pressing plate 634 provided on the lower surface side of the tip end of the arm 633 is rotatably supported with respect to the arm 633 around the Z-axis. The pressing plate 634 is imparted with rotational motion from the correction motor 635 by a belt mechanism provided on the upper surface side of the arm 633. Further, the lower surface side of the pressing plate 634 contacts the base material J mounted on the base stage 30 from above, so that the rotation of the pressing plate 634 can be transferred to the base material J.

In addition, the arm 633 is always pressed upward by the coil spring 638, thereby keeping the pressing plate 634 at a height away from the base material J on the base stage 30.

A pressing air cylinder 639 for lowering the arm 633 against the coil spring 638 is arranged in parallel with the arm 633, and when correction is performed by rotating the base material J, the pressing plate 634 can be lowered to contact the base material J on the mounting plate 34.

Further, the arm turning air cylinder 636 inputs rotational motion to the support shaft 632 via a link member (not shown) provided at the lower end of the support shaft 632.

By the rotational motion input from the arm turning air cylinder 636, the arm 633 can move the pressing plate 634 between a retraction position in front of the mounting plate 34 and a pressing position directly above the mounting plate 34.

[Control System of Hair Planting Apparatus: Control Device]

As shown in FIG. 2, the control device 100 of the hair planting apparatus 10 includes a Read Only Memory (ROM) 102 storing a program for controlling the hair planting operation, a Random Access Memory (RAM) 103 serving as a work area for arithmetic processing, a non-volatile data memory 104 which is storage means for storing various setting data or the like and to which the setting data can be rewritten, and a Central Processing Unit (CPU) 101 for executing programs in the ROM 102.

The CPU 101 is also connected to the first to third capture mechanisms 21 to 23, the looper mechanism 24, and the transport mechanism 25 that form the hair planting unit 20.

Each of the first to third capture mechanisms 21 to 23 includes an air cylinder, and the CPU 101 controls the operations of the mechanisms through electromagnetic valves (not shown).

The looper mechanism 24 includes an actuator, and the CPU 101 controls the operation of the looper mechanism 24 through a drive circuit (not shown) that operates the actuator.

The transport mechanism 25 includes the X-axis stage 26 and the Y-axis stage 27, and the CPU 101 controls the operations of the X-axis stage 26 and the Y-axis stage 27 through a drive circuit (not shown) that operates the X-axis motor 263 of the X-axis stage 26 and the Y-axis motor 273 of the Y-axis stage 27.

The CPU 101 is connected to the position switch mechanism 28 and controls the position switch air cylinder 283 through an electromagnetic valve (not shown).

The CPU 101 is connected to the X-axis roller mechanism 41, controls the X-axis feed motor 412 through a drive circuit (not shown), and controls the retraction air cylinder 416 through an electromagnetic valve (not shown).

Similarly, the CPU 101 is connected to the Y-axis roller mechanism 42, controls the Y-axis feed motor 422 through a drive circuit (not shown), and controls the retraction air cylinder 426 through an electromagnetic valve (not shown).

It is to be noted that although two X-axis roller mechanisms 41 and two Y-axis roller mechanisms 42 are provided, FIG. 2 shows only one of them, respectively.

The CPU 101 is connected to the clamp device 50, controls the clamp air cylinder 54 through an electromagnetic valve (not shown), and controls the strength of the air pressure supplied to the clamp air cylinder 54 with the regulator 56.

The CPU 101 is connected to the lighting device 57, switches ON/OFF of illumination light irradiation, and controls an actuator to move the lighting device 57 to a predetermined position.

The CPU 101 is connected to the wiper mechanism 61 and controls the telescopic air cylinder 612 and the wiping air cylinder 613 through electromagnetic valves (not shown) connected to each thereof.

The CPU 101 is connected to the auxiliary clamp mechanism 62 and controls the auxiliary clamp air cylinder 622 through an electromagnetic valve (not shown).

It is to be noted that although two auxiliary clamp mechanisms 62 are provided, only one is shown in FIG. 2.

The CPU 101 is connected to the correction mechanism 63, controls the correction motor 635 through a drive circuit (not shown), and controls the arm turning air cylinder 636 and the pressing air cylinder 639 through electromagnetic valves (not shown) connected to each thereof.

Both the first blower mechanism 64 and the second blower mechanism 65 include electromagnetic valves for supplying high-pressure air to the nozzles, and the CPU 101 controls each electromagnetic valve to control the discharge of the air.

In addition, the CPU 101 is connected to the camera 11.

Furthermore, the CPU 101 is connected to a pedal 14 for inputting the start of the hair planting operation.

The CPU 101 is also connected to an operation panel 15 having a function as a display unit for displaying various information and a function as an input unit for performing various inputs.

The CPU 101 also includes software modules such as a feed control unit 105, a tension application control unit 106, a state switch control unit 107, a tilt detection unit 108, a correction control unit 109, and the like. It is to be noted that part or all of these software modules may be configured from hardware.

The functions of the software modules described above will be appropriately described in the operation control of the hair planting operation by the hair planting apparatus to be described below.

In addition, the CPU 101 controls various air cylinders, various motors, various actuators, and the like with electromagnetic valves, drive circuits, interfaces, and the like. However, in the following description, descriptions of the electromagnetic valves, drive circuits, and interfaces will be omitted, and it will simply be described that various air cylinders, various motors, various actuators, and the like are controlled.

[Hair Planting Operation Control: Base Set]

Figure 13:
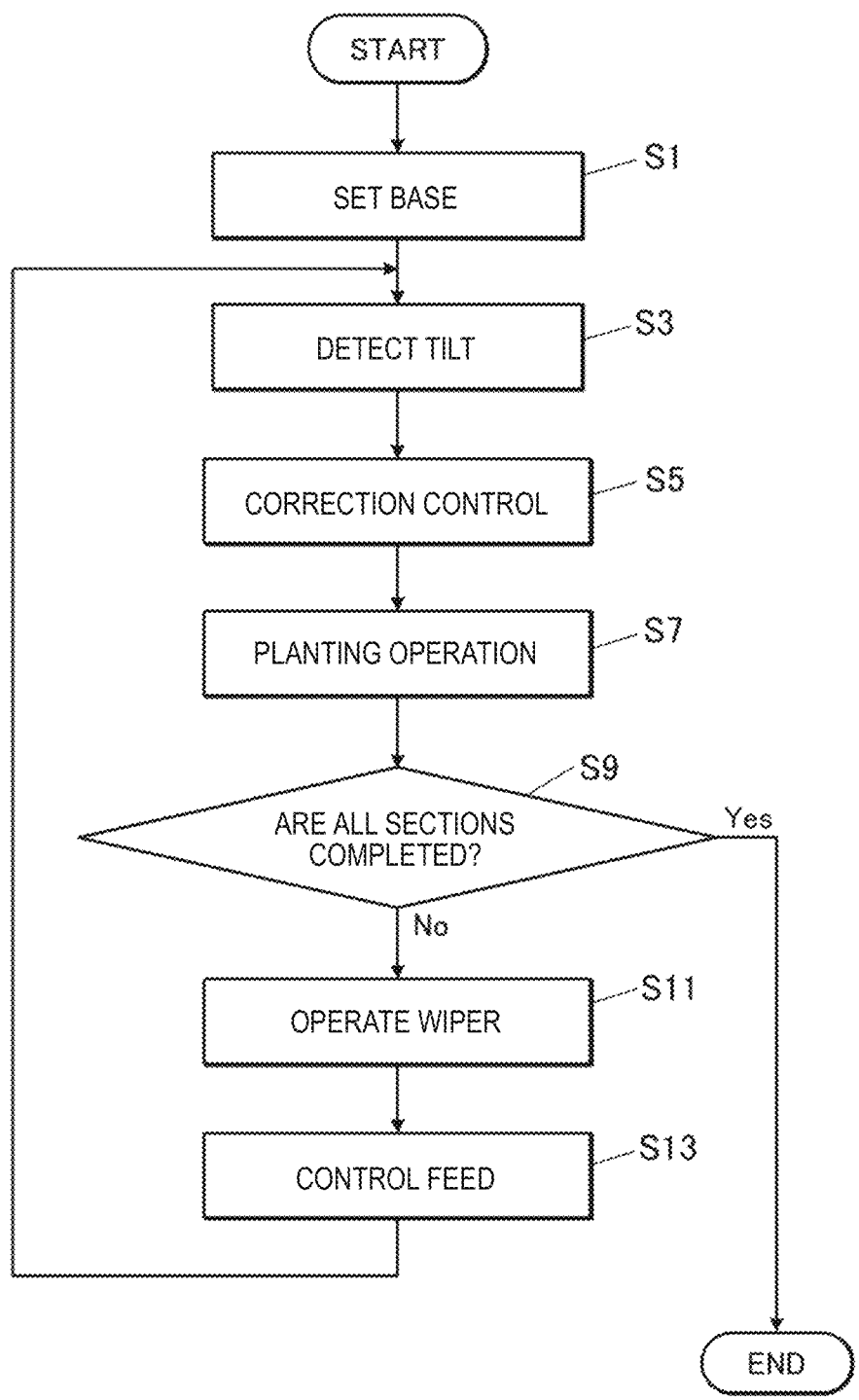
FIG. 13 is a flow chart showing an overall flow of operation control for hair planting operation.

A flow chart of FIG. 13 shows the overall flow of operation control of the hair planting operation executed by the CPU 101.

First, as a preliminary preparation, the CPU 101 controls the clamp air cylinder 54 of the clamp device 50 to move the clamp plate 51 to the lifted position, and controls the auxiliary clamp air cylinders 622 of the respective auxiliary clamp mechanisms 62 to move the auxiliary clamp plates 621 to the released position separated from the X-axis roller mechanism 41.

Then, the CPU 101 executes a process of base set (step S1).

That is, when the base material J is mounted on the mounting plate 34 of the base stage 30 and the start of the hair planting operation is input from the pedal 14, the state switch control unit 107 supplies low air pressure to the clamp air cylinder 54 from the regulator 56 and lowers the clamp plate 51 to the weak clamp position.

[Hair Planting Operation Control: Tilt Detection]

Next, the CPU 101 executes a process of tilt detection (step S3).

That is, the CPU 101 controls the position switch air cylinder 283 of the position switch mechanism 28 to position the position switch plate 282 such that the optical axis of the camera 11 coincides with the center of the work opening 341 at the reference position.

Further, the CPU 101 controls the lighting device 57 to be moved above the upper opening 511 and to irradiate illumination light downward.

Figure 14:
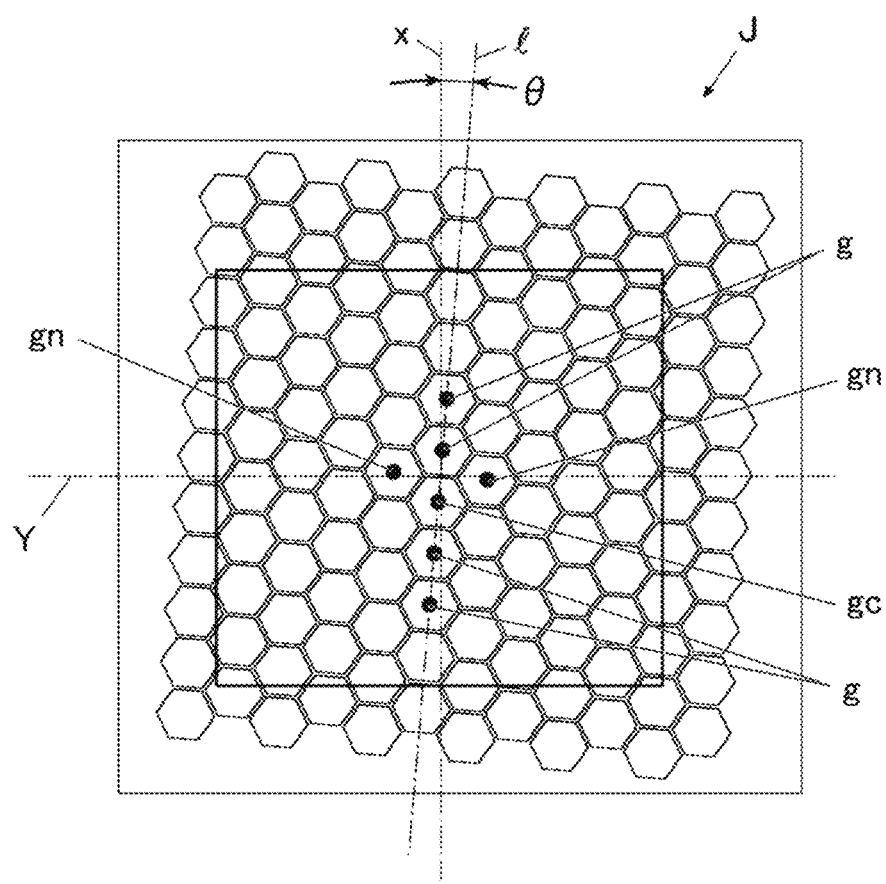
FIG. 14 is an example of an image of mesh holes captured by a camera.

Further, the camera 11 captures an image of the base material J within the range of the work opening 341, and the tilt detection unit 108 extracts a plurality of mesh holes developed on the surface of the base material J from the captured image, and detects the center of gravity g of each mesh hole. FIG. 14 shows an example of an image captured by the camera 11.

As shown in FIG. 14, the tilt detection unit 108 specifies the center of gravity gc closest to the center of the camera (the optical axis of the camera 11), and further specifies two points of the center of gravity g on each of the upper side and the lower side of the center of gravity gc, which are arranged in a straight line and are arranged adjacent thereto such that the total score is 5 points, which is the reference score. In the tilt detection unit, "adjacent" means the state of being adjacent to each other at the shortest interval. In the case of regular polygonal mesh holes such as regular hexagons, for example, the term "closest spacing" refers to the spacing between the centers of gravities of adjacent mesh holes of which sides are in contact with each other.

If there is no particular need to distinguish a specific center of gravity gc or a center of gravity gn to be described below, from the other centers of gravities g, the centers of gravities will be simply referred to as the "center of gravity g".

Then, the tilt detection unit 108 obtains the tilt angle θ of the straight line 1 passing through these five vertically adjacent centers of gravities g with respect to the X-axis direction (vertical direction in the image). This is the tilt of the base material J.

If the tilt angle θ is within the allowable range, it is determined that the base material J is not tilted, and if the tilt angle θ exceeds the allowable value, it is determined that the base material J is tilted.

In addition, there may be cases in which the mesh holes or the centers of gravities are not detected satisfactorily, and only the number of centers of gravities g less than the reference score can be detected. In this cases, the tilt detection unit 108 regards the center of gravity gn of the mesh hole adjacent to the mesh hole of the center of gravity gc on one side in the Y-axis direction as a new center of gravity gc, and detects five centers of gravities g including the center of gravity gn adjacent to each other in the X-axis direction to determine the tilt.

In addition, if five centers of gravities g cannot be obtained for the center of gravity gn, acquisition of five centers of gravities g is attempted for the center of gravity gn up to the specified upper limit number of times on both sides of the original center of gravity gc in the Y-axis direction (for example, left and right twice), and if five centers of gravities g are still not obtained, the tilt detection is stopped. In this case, an error may be notified and the hair planting operation may be interrupted, or the process of tilt detection and the next process of correction control may be skipped and the subsequent hair planting operation may be continued. When the operation continues, the hair planting operation is performed with slightly lower accuracy.

[Hair Planting Operation Control: Correction Control]

Next, the CPU 101 executes the process of correction control (step S5). This correction control is performed by the correction control unit 109 when it is determined in step S3 that the base material J is tilted. In addition, if it is determined that there is no tilt, the process is skipped.

Figure 15:
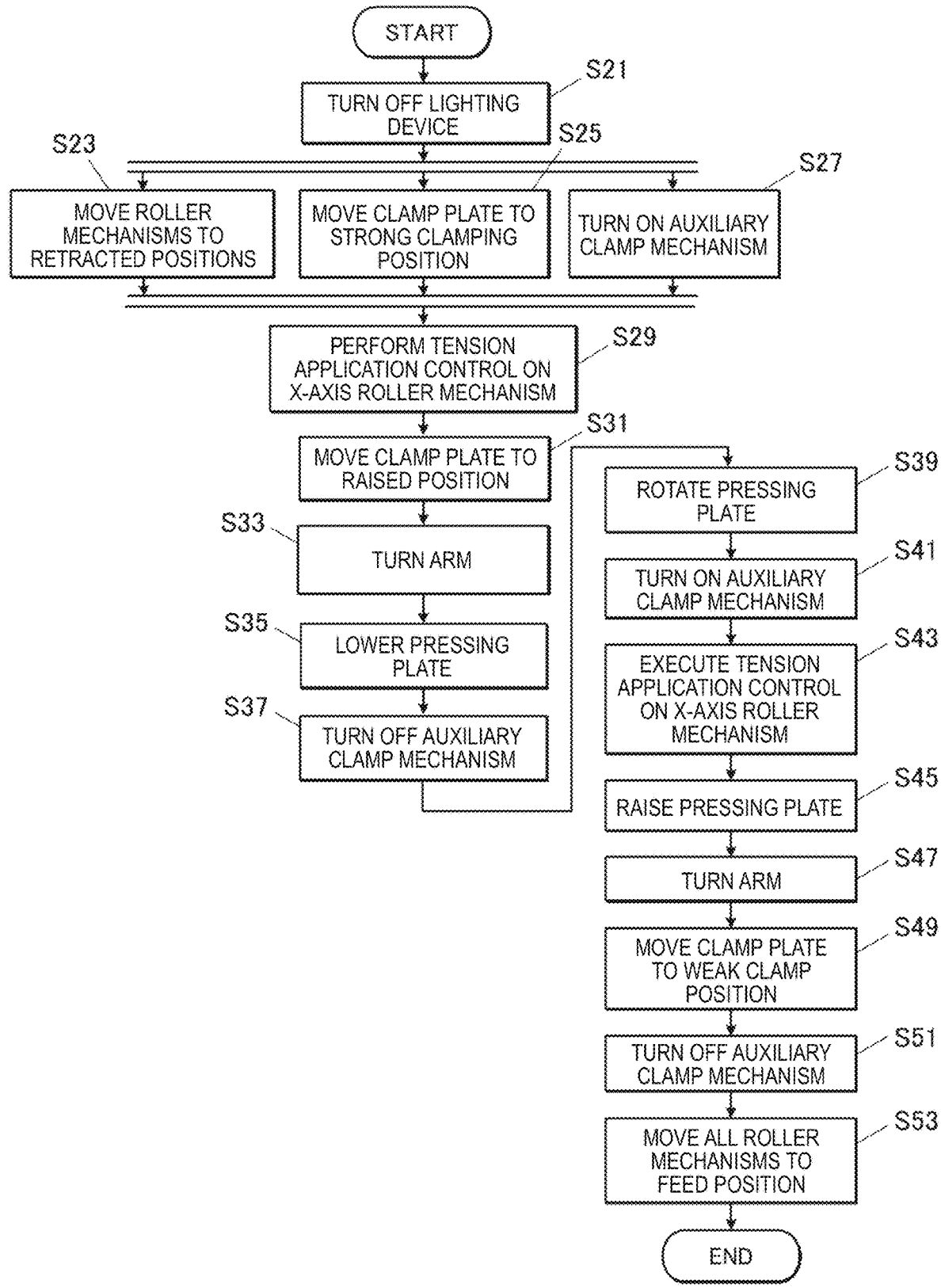
FIG. 15 is a flowchart of correction control.

The correction control by the correction control unit 109 is shown in the flowchart of FIG. 15.

As illustrated, the correction control unit 109 turns off the lighting device 57 used for the tilt detection and retracts it from the upper opening 511 (step S21).

Next, the correction control unit 109 controls the feed device 40, the clamp device 50, and the auxiliary clamp mechanism 62 in parallel.

That is, the correction control unit 109 controls the retraction air cylinders 416 and 426 of the pair of X-axis roller mechanisms 41 and the pair of Y-axis roller mechanisms 42 of the feed device 40 to lower the respective rollers 411 and 421 to the retraction positions (step S23).

In addition, the state switch control unit 107 supplies high air pressure to the clamp air cylinder 54 from the regulator 56, and lowers the clamp plate 51 of the clamp device 50 to the strong clamp position to hold the base material J on the mounting plate 34 (step S25).

Further, the correction control unit 109 controls the auxiliary clamp air cylinders 622 of the respective auxiliary clamp mechanisms 62 to bring the respective auxiliary clamp plates 621 into contact with the rollers 411 of the pair of X-axis roller mechanisms 41, thereby auxiliary clamping the base material J (step S27).

Next, the tension application control unit 106 performs tension application control on the X-axis feed motors 412 of the pair of X-axis roller mechanisms 41 to remove slack in the base material J (step S29).

Then, while the base material J is in the auxiliary clamped state, the correction control unit 109 controls the clamp air cylinder 54 to retract the clamp plate 51 to the lifted position (step S31).

Next, the correction control unit 109 controls the arm turning air cylinder 636 to move the pressing plate 634 above the mounting plate 34 (step S33), and controls the pressing air cylinder 639 to lower the pressing plate 634 and hold the base material J from above (step S35).

Further, the correction control unit 109 controls the auxiliary clamp air cylinders 622 of the respective auxiliary clamp mechanisms 62 to release the auxiliary clamping by the respective auxiliary clamp plates 621 (step S37), and then controls the correction motor 635 to rotate the base material J in the direction for correcting the tilt angle θ detected by the tilt detection unit 108 (step S39).

Next, the correction control unit 109 controls the auxiliary clamp air cylinders 622 of the respective auxiliary clamp mechanisms 62 to return the respective auxiliary clamp plates 621 to the auxiliary clamping state (step S41). Furthermore, the tension application control unit 106 executes tension application control by the X-axis feed motors 412 of the pair of X-axis roller mechanisms 41 (step S43).

Further, the correction control unit 109 controls the pressing air cylinder 639 of the correction mechanism 63 to raise the pressing plate 634 (step S45), and also controls the arm turning air cylinder 636 to move the pressing plate 634 to the retraction position separated away from the mounting plate 34 (step S47).

Then, the state switch control unit 107 supplies low air pressure to the clamp air cylinder 54 from the regulator 56 to lower the clamp plate 51 of the clamp device 50 to the weak clamp position (step S49).

Further, the correction control unit 109 controls the auxiliary clamp air cylinders 622 of the respective auxiliary clamp mechanisms 62 to release the base material J from the auxiliary clamping by the respective auxiliary clamp plates 621 (step S51).

Then, the correction control unit 109 controls the retraction air cylinders 416 and 426 of the pair of X-axis roller mechanisms 41 and the pair of Y-axis roller mechanisms 42 of the feed device 40 to raise the respective rollers 411 and 421 to the feed position (step S53).

[Hair Planting Operation Control: Planting]

Next, the CPU 101 executes the process of hair planting operation (step S7).

In the process of hair planting operation, the CPU 101 controls the lighting device 57 so as to be moved above the upper opening 511 and also irradiate illumination light downward, and cause the camera 11 to capture an image of the base material J.

Then, the CPU 101 extracts each mesh hole developed in a predetermined section of the base material J, and specifies the binding positions of the hair for planting around all the mesh holes.

Then, the CPU 101 retracts the lighting device 57 and controls the position switch air cylinder 283 of the position switch mechanism 28 to position the position switch plate 282 such that the center of the hook needle of the first capture mechanism 21 coincides with the center of the work opening 341 at the reference position.

Then, by controlling the first to third capture mechanisms 21 to 23, the looper mechanism 24, and the X-axis motor 263 and Y-axis motor 273 of the transport mechanism of the hair planting unit 20, a binding operation of hair for planting is performed for each binding position specified by imaging within a predetermined section.

The operations of the first to third capture mechanisms 21 to 23, the looper mechanism 24, and the X-axis motor 263 and Y-axis motor 273 of the transport mechanism of the hair planting unit 20 for binding the hair for planting are substantially the same as the hair planting operation disclosed in FIGS. 10 to 22 of JP2018-040084A described above, and detailed description thereof will be omitted.

Then, when the hair for planting is bound to all binding points in the section, the CPU 101 determines whether or not the planting is completed for all sections scheduled for the base material J (step S9), and when planting is completed for all sections, the CPU 101 raises the clamp plate 51 of the clamp device 50 to the lifted position to release the base material J on the mounting plate 34 from restraint, and finishes the hair planting operation.

[Hair Planting Operation Control: Wiper Operation]

On the other hand, if the hair planting is not completed for all the sections, the CPU 101 executes a process of wiper operation (step S11).

First, the CPU 101 controls the retraction air cylinders 416 and 426 of the pair of X-axis roller mechanisms 41 and the pair of Y-axis roller mechanisms 42 of the feed device 40 to lower the respective rollers 411 and 421 to the retraction positions.

Further, the CPU 101 controls the auxiliary clamp air cylinders 622 of the respective auxiliary clamp mechanisms 62 to bring the respective auxiliary clamp plates 621 into contact with the rollers 411 of the pair of X-axis roller mechanisms 41, thereby auxiliary clamping the base material J.

Further, the tension application control unit 106 performs tension application control on the X-axis feed motors 412 of the pair of X-axis roller mechanisms 41 to remove slack in the base material J.

Next, the CPU 101 controls the clamp air cylinder 54 of the clamp device 50 to retract the clamp plate 51 to the lifted position.

Then, the CPU 101 advances the wiper member 611 with the wiping air cylinder 613 of the wiper mechanism 61 and extends the wiper member 611 with the telescopic air cylinder 612. Then, by moving the wiper member 611 backward by the wiping air cylinder 613, the wiper member 611 wipes backward the hair for planting that extends upward from the base material J and is inserted into the upper opening 511 so as to be wiped away from the upper opening 511. The wiper member 611 moved backward is returned to the contracting state by the telescopic air cylinder 612.

In addition, when the wiper member 611 is completely wiped away, the CPU 101 causes the first blower mechanism 64 to blow air backward, thereby preventing the hair for planting from standing back up from the backwardly blown state due to the restoring force.

Further, when the feed direction of the base material J is along the Y-axis direction for the movement of the next section, the second blower mechanism 65 may blow air toward the downstream side of the base material J in the feed direction to push the hair for planting to the downstream side in the feed direction.

Then, the state switch control unit 107 supplies low air pressure to the clamp air cylinder 54 from the regulator 56 to lower the clamp plate 51 of the clamp device 50 to the weak clamp position.

The correction control unit 109 controls the auxiliary clamp air cylinders 622 of the respective auxiliary clamp mechanisms 62 to release the base material J from the auxiliary clamping by the respective auxiliary clamp plates 621.

[Hair Planting Operation Control: Feed Control]

Next, the CPU 101 executes a process of feed control (step S13). This feed control is performed by the feed control unit 105.

The feed control unit 105 first controls the retraction air cylinders 416 or 426 of the pair of X-axis roller mechanisms 41 or the pair of Y-axis roller mechanisms 42 of the feed device 40 to raise the respective rollers 411 or 421 to the feed position.

Further, the feed control unit 105 controls the X-axis feed motor 412 of each X-axis roller mechanism 41 or the Y-axis feed motor 422 of each Y-axis roller mechanism 42 of the feed device 40 to feed the base material J in a predetermined section unit for the hair planting operation. For example, when a square or rectangular section that fits within the range of the work opening 341 is set, and the hair planting within the range of the section is completed, the feed control unit 105 executes an operation control to feed the base material J in the X-axis or Y-axis direction by a width corresponding to one section, and to move the base material J to the next section.

When the feed operation to the next section is completed, the state switch control unit 107 supplies high air pressure to the clamp air cylinder 54 from the regulator 56 to lower the clamp plate 51 of the clamp device 50 to the strong clamp position.

Then, the CPU 101 returns the process to step S3, and executes the tilt detection, the correction control, the hair planting operation, and the like for the new section.

Technical Effect of Embodiment of Present Disclosure

As described above, the hair planting apparatus 10 includes the X-axis roller mechanism 41 for feeding the base material J to the mounting plate 34 in the X-axis direction by the rollers 411, and the feed device 40 having the Y-axis roller mechanism 42 for feeding the base material J to the mounting plate 34 in the Y-axis direction by the rollers 421.

Therefore, it is unnecessary to manually perform the operation of reattaching the base material J in order to change the execution area of the operation of planting hair on the base material J with respect to the work opening 341 of the mounting plate 34, and the base material J can be efficiently planted over a wide area.

In addition, since the hair planting apparatus 10 is provided with the feed control unit 105 that feeds the base material J to the feed device 40 based on a predetermined unit of sections for the hair planting operation, the hair planting apparatus 10 can perform planting according to the predetermined unit of sections, and can uniformly perform the planting a wide area of the base material J.

In addition, since both the X-axis roller mechanism 41 and the Y-axis roller mechanism 42 of the feed device 40 include two rollers 411 or two rollers 421 arranged with the mounting plate 34 interposed therebetween in each feed direction, the base material J can be fed satisfactorily in the positive and reverse directions along the X-axis direction and in the positive and reverse directions along the Y-axis direction, respectively, thereby improving the feeding accuracy and thus enabling the performance of the high-quality planting.

Further, the X-axis roller mechanism 41 of the feed device 40 includes the X-axis feed motor 412 as a drive source for each of two rollers 411, and the Y-axis roller mechanism 42 includes the Y-axis feed motor 422 as a drive source for each of two rollers 421. The control device 100 of the feed device 40 includes the tension application control unit 106 that controls the respective roller mechanisms 41 and 42 to rotate the motors of two rollers in directions opposite to each other.

Therefore, tension can be imparted to the base material J to prevent the occurrence of slack, so that the hair for planting can be combined with the base material J with high positional accuracy, thereby enabling the performance of the high-quality planting.

The hair planting apparatus 10 also includes the clamp device 50 that presses with the clamp plate 51 the base material J mounted on the mounting plate 34 from above, and the base material J can be clamped and held in position after the feed operation of the base material J is performed by the feed device 40, so that it is possible to perform the hair planting operation while maintaining the position after feeding, and perform satisfactory planting on the base material J over a wide area.

In addition, the clamp device 50 includes the state switch control unit 107 that controls the height and holding force of the clamp plate 51 by means of the regulator 56 with respect to the clamp air cylinder 54 for lifting and lowering the clamp plate 51, so as to switch the base material between a restraining state and a feed enabled state.

Therefore, according to the feed enabled state of the base material, the clamp plate 51 appropriately presses the base material J against the rollers 411 and 421 of the X-axis roller mechanism 41 and the Y-axis roller mechanism 42, respectively, thereby enabling smooth feeding, and feeding the base material J with high accuracy.

Furthermore, by having the base material in the restrained state, it is possible to hold the fed base material J with high accuracy, thereby enabling the performance of the high-quality planting.

In addition, since the hair planting apparatus 10 includes the wiper mechanism 61 that wipes out the planted hair for planting to the outside of the upper opening 511 of the clamp plate 51, the clamp plate 51 can prevent the hair for planting from being caught in the upper opening 511 when re-clamping, and it is possible to reduce the influence of the hair for planting on the hair planting operation, the feed operation of the base material J, the imaging from the operation opening 341, and the like.

In addition, the hair planting apparatus 10 includes the tilt detection unit 108 that obtains, from the image captured by the camera 11, an alignment direction of the plurality of mesh holes of the base material J, the correction mechanism 63 that changes an orientation of the base material J on the mounting plate 34 with respect to the camera 11, and the correction control unit 109 that corrects, by the correction mechanism 63, the orientation of the base material J on the mounting plate 34 according to the tilt angle of the alignment direction of the plurality of mesh holes of the base material J with respect to the predetermined direction.

Therefore, it is possible to correct the direction of the base material J, which is changed in orientation due to various factors such as the feed operation and the clamp operation by the clamp device 50, to an appropriate orientation, and bind the hair for planting with respect to the base material J with high positional accuracy, thereby enabling the performance of the high-quality planting.

Further, since the correction mechanism 63 corrects the orientation by rotating the base material J with respect to the mounting plate 34, the subject of rotation is minimized, thereby enabling the size reduction of the correction mechanism 63 and realization of the miniaturization of the entire apparatus.

In addition, the hair planting apparatus 10 includes the position switch mechanism 28 that switches the positions of the camera 11 and the first capture mechanism 21 such that the work opening 341 of the mounting plate 34 is arranged from below.

This eliminates the need to arrange the camera 11 and the first capture mechanism 21 side by side on the same axis, making it possible to reduce the size of the hair planting apparatus 10.

In addition, since the position switch mechanism 28 performs position switching such that the hook needle 211 and the optical axis of the camera 11 are switched on the same axis, the hair planting apparatus 10 can be miniaturized particularly in the direction of the optical axis of the camera 11.

[Others]

Each embodiment of the present disclosure has been described above. However, the present disclosure is not limited to the above embodiments. For example, in certain embodiments, components that are integrally formed from a single member may be replaced with components that are split into multiple members and coupled or affixed together. In addition, a component configured by connecting a plurality of members may be replaced with a component integrally formed by a single member. Other details shown in the embodiments can be changed as appropriate without departing from the scope of the present disclosure.

[Other Forms of Correction Mechanism]

In the embodiment described above, the configuration of the correction mechanism 63 in which the base material J on the mounting plate 34 is held from above and the mounting plate 34 is rotated is illustrated, but the correction mechanism 63 is not limited thereto.

For example, as shown in FIG. 16, instead of the correction mechanism 63, the hair planting apparatus 10 may be mounted with another correction mechanism 66 for correcting the orientation of the base material J by rotating the mounting plate 34 together with the base material J.

The correction mechanism 66 will be described in detail below.

The correction mechanism 66 can rotate the transport mechanism 25 provided between the base 12 and the X-axis stage 26 and around the Z-axis passing through the center of the work opening 341 of the mounting plate 34 at the reference position, and the components (base stage 30, and the like) supported by the transport mechanism 25.

Specifically, the correction mechanism 66 includes a bearing 662 directly provided on the upper surface of the base 12 and allows rotation about the Z-axis passing through the center of the work opening 341 of the mounting plate 34, a rotation stage 661 rotatably supported by the bearing 662, and a rotation mechanism (not shown) that imparts a rotational force to the rotation stage 661. The rotation mechanism includes a drive source such as a servomotor that enables the control device 100 to control the rotation angle.

The transport mechanism 25 (X-axis stage 26 and the Y-axis stage 27), the base stage including the mounting plate 34, the wiper mechanism 61, the auxiliary clamp mechanism 62, the first blower mechanism 64, the second blower mechanism 65, the feed device 40, and the clamp device 50 are mounted directly or indirectly on the rotation stage 661 of the correction mechanism 66 and applied with rotational motion around the Z-axis with respect to the base 12.

On the other hand, the first capture mechanism 21, the second capture mechanism 22, the third capture mechanism 23, the position switch mechanism 28 that supports the camera 11, and the looper mechanism 24 are mounted on the base 12 and applied with no rotation by the correction mechanism 66.

When mounting the correction mechanism 66 on the hair planting apparatus 10, it is preferable to mount a holding mechanism 67 on the base 12 to press the base material J on the mounting plate 34 from above to restrain the base material J from rotating when the mounting plate 34 rotates.

In the holding mechanism 67 illustrated, since the correction mechanism 63 described above is identical to many members, as for the members common to the correction mechanism 63 described above, the names and symbols of the members of the correction mechanism 63 described above are used, and redundant explanations are omitted.

The holding mechanism 67 includes the support shaft 632 rotatably supported around the Z-axis by the bracket 631 installed on the base 12, the arm 633 fixed to the upper end of the support shaft 632, the pressing plate provided at the tip end of the arm 633, the arm turning air cylinder 636 that imparts rotational motion to the support shaft 632, the spline nut 637, the coil spring 638, and the pressing air cylinder 639 that lowers the arm 633 (see FIGS. 2 and 5).

The holding mechanism 67 differs from the correction mechanism 63 described above in that the pressing plate is fixedly supported by the arm 633 and does not include the correction motor 635 for rotating the pressing plate.

In the holding mechanism 67, with the configuration described above, when the base stage 30 is rotated by the correction mechanism 66, the pressing plate moved above the mounting plate 34 by the arm 633 rotated by the arm turning air cylinder 636 is lowered by the holding air cylinder 639 to hold to prevent the base material J from rotating together with the base stage 30.

Figure 17:
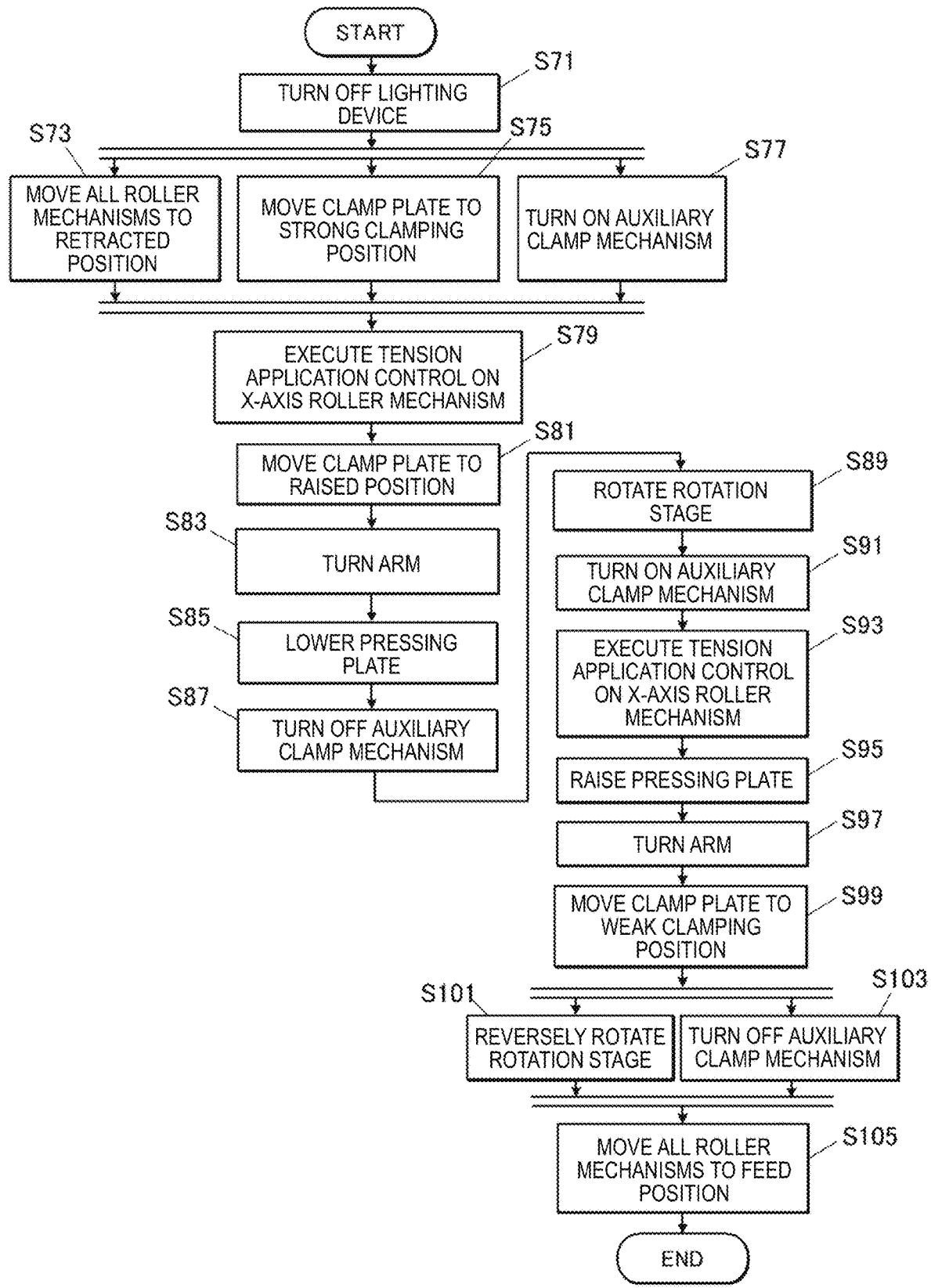
FIG. 17 is a flow chart of correction control by another correction mechanism.

The correction control performed by the correction control unit 109 on the hair planting apparatus 10 including the correction mechanism 66 and the holding mechanism 67 will be described with reference to the flowchart of FIG. 17. The correction control by the correction mechanism 66 is performed at the same timing as the correction control shown in step S5 in the flowchart of FIG. 13 described above.

The tilt detection described above (see step S3 in FIG. 13) is performed immediately before the correction control, and the correction control unit 109 turns off the lighting device 57 used at that time and retracts it from the upper opening 511 (step S71).

Next, the correction control unit 109 controls the feed device 40, the clamp device 50, and the auxiliary clamp mechanism 62 in parallel.

That is, the correction control unit 109 controls the retraction air cylinders 416 and 426 of the pair of X-axis roller mechanisms 41 and the pair of Y-axis roller mechanisms 42 of the feed device 40 to lower the respective rollers 411 and 421 to the retraction positions (step S73).

In addition, the state switch control unit 107 supplies high air pressure to the clamp air cylinder 54 from the regulator 56, and lowers the clamp plate 51 of the clamp device 50 to the strong clamp position to hold the base material J on the mounting plate 34 (step S75).

Further, the correction control unit 109 controls the auxiliary clamp air cylinders 622 of the respective auxiliary clamp mechanisms 62 to bring the respective auxiliary clamp plates 621 into contact with the rollers 411 of the pair of X-axis roller mechanisms 41, thereby auxiliary clamping the base material J (step S77).

Next, the tension application control unit 106 performs tension application control on the X-axis feed motors 412 of the pair of X-axis roller mechanisms 41 to remove slack in the base material J (step S79).

Then, while the base material J is in the auxiliary clamped state, the correction control unit 109 controls the clamp air cylinder 54 to retract the clamp plate 51 to the lifted position (step S81).

Next, the correction control unit 109 controls the arm turning air cylinder 636 to move the pressing plate above the mounting plate 34 (step S83), and controls the pressing air cylinder 639 to lower the pressing plate and hold the base material J from above (step S85).

Furthermore, the correction control unit 109 controls the auxiliary clamp air cylinders 622 of the respective auxiliary clamp mechanisms 62 to release the auxiliary clamping by the respective auxiliary clamp plates 621 (step S87), and then controls the drive source of the correction mechanism 66 to rotate the rotation stage 661 by the same tilt angle θ in the same direction as the tilt angle θ of the base material J detected by the tilt detection unit 108 (step S89).

As a result, the base material J is pressed from above by the pressing plate to be restrained from rotating, and the rotation stage 661, the base stage 30, and the mounting plate 34 generate rotation by the tilt angle θ. That is, the base stage 30 and the mounting plate 34 are shifted by the same tilt angle θ as the base material J.

Next, the correction control unit 109 controls the auxiliary clamp air cylinders 622 of the respective auxiliary clamp mechanisms 62 to return the respective auxiliary clamp plates 621 to the auxiliary clamping state (step S91). Furthermore, the tension application control unit 106 executes tension application control by the X-axis feed motors 412 of the pair of X-axis roller mechanisms 41 (step S93).

Further, the correction control unit 109 controls the pressing air cylinder 639 of the holding mechanism 67 to raise the pressing plate (step S95).

Then, the correction control unit 109 controls the arm turning air cylinder 636 to move the pressing plate 634 to the retraction position separated from the mounting plate 34 (step S97).

Then, the state switch control unit 107 supplies low air pressure to the clamp air cylinder 54 from the regulator 56 to lower the clamp plate 51 of the clamp device 50 to the weak clamp position (step S99).

Furthermore, the correction control unit 109 controls the correction mechanism 66 and the auxiliary clamp mechanism 62 in parallel.

That is, the correction control unit 109 controls the drive source of the correction mechanism 66 to rotate the rotation stage 661 by the same tilt angle θ as the tilt angle θ of the base material J detected by the tilt detection unit 108 in a direction opposite to the direction in which the tilt occurs (step S101).

As a result, the base material J, along with the rotation stage 661, rotates the base stage 30 and the mounting plate 34 by the tilt angle θ in a direction opposite to the tilting direction, and the state in which the base material J, the base stage 30, and the mounting plate 34 are misaligned at the tilt angle θ is eliminated.

In parallel with the operation of the correction mechanism 66, the correction control unit 109 controls the auxiliary clamp air cylinder 622 of the respective auxiliary clamp mechanisms 62 to release from the state of being auxiliary clamped by respective auxiliary clamp plates 621 (step S103).

Then, the correction control unit 109 controls the retraction air cylinders 416 and 426 of the pair of X-axis roller mechanisms 41 and the pair of Y-axis roller mechanisms 42 of the feed device 40 to raise the respective rollers 411 and 421 to the feed position (step S105).

Since the correction mechanism 66 rotates the base material J together with the base stage 30 to correct the tilt angle, it is possible to perform the correction with higher accuracy.

In addition, it is possible to perform tilt detection for confirmation immediately after correction, and to quickly retry angle correction if the base material J is still tilted. Further, when the angle of the base material J is corrected in a retry, the tilt may be corrected by a single rotational motion in the direction of eliminating the tilt by the correction mechanism 66 without the operation of the holding mechanism 67.

[Other Forms of Feed Control]

In the operation control of the hair planting operation shown in FIG. 13 described above, although it is exemplified that the feed control unit 105 controls to feed the base material J based on a predetermined unit of sections for performing the hair planting operation, the feed control unit 105 may perform more advanced feed control.

In this example, for the feed control of the base material J, for example, transfer control is exemplified, in which the feed control unit 105 automatically traces, for a plurality of sections D positioned in the target range of hair planting of the base material J, all the sections D from the section D that is the start position of the hair planting to the section D that is the end position thereof for feeding.

FIG. 18 is a plan view of the base material J. The ellipse in the drawing surrounds most of the upper surface of the base material J and is a boundary line B indicating that a region therein is the target range of hair planting. The boundary line B may be anything as long as it can be optically distinguished from the surroundings. For example, a thin thread passed through each mesh hole and attached may be used. In addition, the boundary line B is not limited to a geometric ellipse, but may be a substantially elliptical shape, a perfect circle, an elliptical shape, or any other shape that is surrounded by curves with continuous slopes, or that only includes curved lines that are convex outside the region.

In FIG. 18, arrows indicate a feed path R. The feed control unit 105 combines feeding in a main scanning direction and feeding in a sub scanning direction along the feed path R to impart the feed operation to the base material J, and executes feed control so as to position all of the sections D positioned in the target range of hair planting within the work opening 341 of the mounting plate 34. In this example, all sections D that partially overlap with the target range of hair planting surrounded by the boundary line B are also targeted.

The example where the main scanning direction is the X-axis direction and the sub scanning direction is the Y-axis direction is exemplified herein, but the directions may be reversed.

In addition, the direction of proceeding of the arrow in the feed path R shown in FIG. 18 indicates the relative movement direction of the center of the work opening 341 of the mounting plate 34 (the center of the optical axis of the camera 11) with respect to the base material J, and also coincides with the direction in which the operation of planting hair of the base material J is proceeded.

On the other hand, in practice, the base material J is fed in the opposite direction to the direction of proceeding indicated by the arrow of the feed path R while the mounting plate 34 and the camera 11 are fixed.

In the following description, the terms "proceed", "proceeded" refer to a relative direction of proceeding the planting position or the imaging position of the camera 11 with respect to the base material J (for example, the same direction as the arrow of the feed path R), and "feed" or "fed" with respect to the base material J refers to a direction in which the base material J is actually fed by the feed device 40 (for example, the direction opposite to the arrow of the feed path R).

The feed control unit 105 starts planting from one end (for example, rear end) of the sections D arranged in a column along the main scanning direction (X-axis direction) located at the end (for example, right end) in the sub scanning direction (Y-axis direction), repeats the process of proceeding in the sub scanning direction and starting planting from the other end (for example, the front end) of the adjacent column when completing the planting of the section D for one column, and feeds the base material J by proceeding planting such that forward and reverse directions of proceeding along the main scanning direction are alternately switched, thereby automatically performing the planting for all sections D positioned in the target range of hair planting.

In order to proceed as described above, the feed control unit 105 sets a section range Da corresponding to one section D in the center portion of the imaging range of the camera 11. Then, upon starting imaging from a predetermined imaging start position S (for example, one end (rightmost end) in the sub scanning direction (Y-axis direction) of the boundary line B), planting is proceeded along an appropriate feed path R, while specifying a section D that is the start end and end of each column from the extension condition of the boundary line B imaged within the section range Da, and determining whether to feed in the main scanning direction or to feed in the sub scanning direction.

Next, a process for the feed control unit 105 to proceed with hair planting along the feed path R shown in FIG. 18 will be described with reference to FIGS. 19A to 22 which show the relationship between the extension condition of the boundary line B imaged within the section range and the feed direction to be selected.

Since the extension condition of the boundary line B imaged within the section range differs between the section positioned at one end of the column of section D arranged in the main scanning direction, the section positioned at the other end, and the section positioned between theses sections, these sections can be identified according to which extension condition the section D to be imaged corresponds to.

In addition, since the extension condition of the boundary line B differs between one area (right region) and the other area (left region) in the sub scanning direction, determination is performed in consideration of these.

First, by controlling the operation of the feed device 40, the base material J is fed for the camera 11 to image the imaging start position S. This feeding may be performed by a human who may operate to designate the imaging start position S within the imaging range of the camera 11, or may be performed by the feed control unit 105 that searches for the imaging start position S.

For the searching by the feed control unit 105, for example, the base material J is set so as to be mounted on the mounting plate 34 at the center portion of the base material J, and the feed device 40 continues to feed the base material J to the left such that the imaging range is moved to the right side of the base material J. As a result, when the boundary line B is detected within the imaging range, the camera 11 is fed such that the line of sight thereof follows the boundary line B, and the position where the amount of leftward feeding of the base material J from the start of feeding is maximum is specified as the imaging start position S.

When a section D1 is set so as to include the imaging start position S, since the section D1 belongs to the first column of the target range of hair planting to start the hair planting, the section D positioned at one end of the column is searched. For example, when a section D2 positioned at the rear end of the column is set as the section to start the hair planting, the section D2 is searched according to the extension condition of boundary line B at the rear end of the column.

Since the imaging start position S belongs to one area (right region) in the sub scanning direction, the section D2 is searched according to the extension condition of the boundary line B at the rear end of the column in the right region.

By feeding the base material J forward from the section D1 in units of the length of one section D, the imaging position is moved backward.

Then, the feed control unit 105 monitors the captured image each time the feed for one section is performed, and determines whether or not the captured image meets the extension condition of the boundary line B at the rear end of the column in the right region.

Figure 19A:
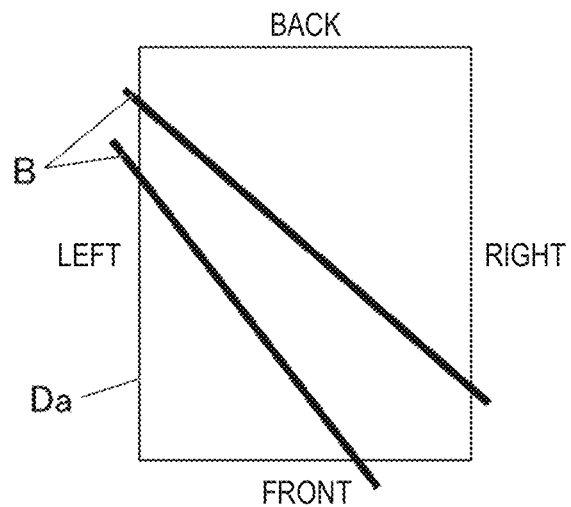
FIG. 19A shows extension conditions for a boundary line at a rear end of a column in a right region.

As shown in FIG. 19A, the extension condition of the boundary line B at the rear end of the column in the right region is that the boundary line B passes through the front and left sides of the section range Da, or the right and left sides of the section range Da, and when any of these extension conditions is satisfied, the section D2 positioned at the rear end of the column can be detected.

When the section D2 is detected, planting is started from the section D2, and the base material J is fed backward in units of the length of one section, thereby proceeding the planting forward.

Then, the feed control unit 105 monitors the captured image each time the feed for one section is performed, and determines whether or not the captured image meets the extension condition of the boundary line B at the front end of the column in the right region.

Figure 19B:
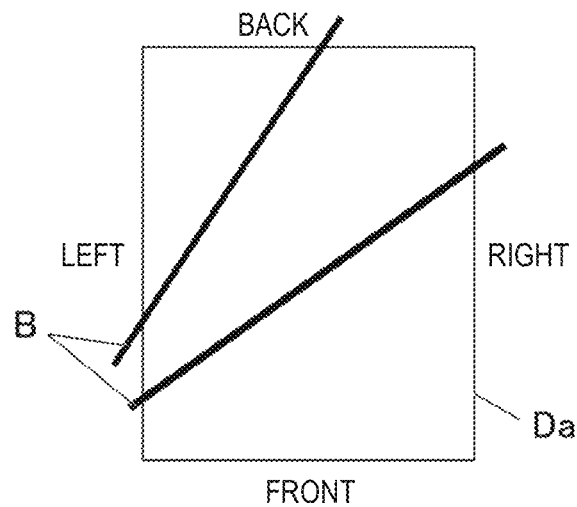
FIG. 19B shows extension conditions for a boundary line at a front end of a column in a right region.

As shown in FIG. 19B, the extension condition of the boundary line B at the front end of the column in the right region is that the boundary line B passes through the rear and left sides of the section range Da, or the right and left sides of the section range Da, and when any of these extension conditions is satisfied, a section D3 positioned at the front end of the column can be detected.

Then, when the hair planting is completed in the section D3, the base material J is fed to the right in the sub scanning direction in units of the width of one section, and the imaging position is moved to the left adjacent column.

When proceeding to the next column to the left, the feed control unit 105 searches for a new section D3 positioned at the front end of the column. Regarding the right region, if the first section D in the column next to the left does not satisfy the extension condition of the boundary line B at the front end of the column, the section D3 is searched in the same direction (in this case, forward) as the direction of proceeding of hair planting in the immediately preceding column.

The detection of the section D3 is already described above.

When the section D3 is detected, planting is started from the section D3, and the base material J is fed forward in units of the length of one section in a direction opposite to that of the previous column, thereby proceeding hair planting backward.

Then, the detection of the section D2 while planting and moving one section at a time backward in the main scanning direction and the proceeding of one section in the sub scanning direction, and the detection of the section D3 while planting and moving one section at a time forward in the main scanning direction, and the proceeding of one section in the sub scanning direction are repeated by the same control as described above.

Here, as described above, the extension conditions of the boundary line B are different between the right region and the left region in the sub scanning direction, and as the planting proceeds in the right region, the left region is eventually reached.

Therefore, when detecting the section D2 at the rear end of the column described above, it is determined whether or not both of the extension condition of the boundary line B at the rear end of the column of the right region, and the extension condition of the boundary line B when reaching the rear end of the first column of the left region are satisfied.

Likewise, when detecting the section D3 at the front end of the column described above, it is determined whether or not both the extension condition of the boundary line B at the front end of the column of the right region, and the extension condition of the boundary line B when reaching the front end of the first column of the left region are satisfied.

From the above determinations, it can be seen that the section D to perform the hair planting changed from the right region to the left region.

Figure 20A:
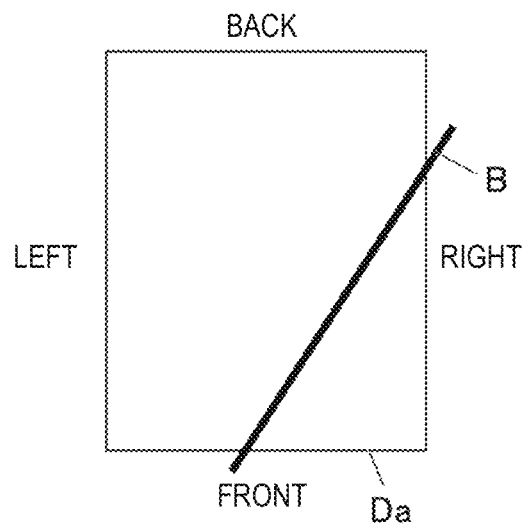
FIG. 20A shows extension conditions for a boundary line at a rear end of a first column in a left region.

As shown in FIG. 20A, the extension condition of the boundary line B at the rear end of the first column in the left region is that the boundary line B passes through the front and right sides of the section range Da, and when these extension conditions is satisfied, a section D4 positioned at the rear end of the column can be detected.

If the direction of proceeding immediately before the detection of the section D4 was backward in the main scanning direction, when the section D4 is detected, the next direction of proceeding is now leftward in the sub scanning direction and accordingly, the process moves to the next column.

In addition, if the direction of proceeding immediately before the detection of the section D4 was leftward in the sub scanning direction (that is, movement to the adjacent column), search for a section D6 (to be described below) positioned at the rear end of the column is executed, and if not found, the search is repeated until the section D6 is found by moving based on a predetermined unit of sections in the direction opposite to the direction of proceeding in the immediately preceding column. Then, upon detecting the section D6 (to be described below), the next direction of proceeding is now forward in the main scanning direction.

Figure 20B:
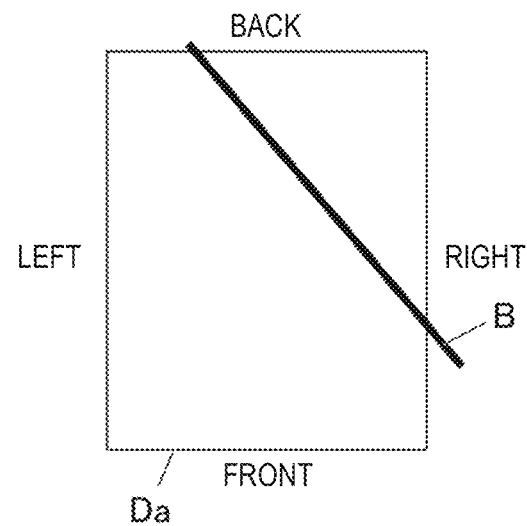
FIG. 20B shows extension conditions for a boundary line at a front end of a first column in a left region.

As shown in FIG. 20B, the extension condition of the boundary line B at the front end of the first column in the left region is that the boundary line B passes through the rear and right sides of the section range Da, and when this extension condition is satisfied, a section D5 positioned at the rear end of the column can be detected.

If the direction of proceeding immediately before detection of the section D5 was forward in the main scanning direction, when the section D5 is detected, the next direction of proceeding is now leftward in the sub scanning direction and accordingly, the process moves to the next column.

In addition, if the direction of proceeding immediately before the detection of the section D5 was leftward in the sub scanning direction (that is, movement to the adjacent column), a section D7 (to be described below) positioned at the front end of the column is searched, and if not found, the search is repeated until the section D7 is found, by moving according to a predetermined unit of sections in the direction opposite to the direction of proceeding in the immediately preceding column. Then, upon detecting the section D7 (to be described below), the next direction of proceeding is now backward in the main scanning direction.

Furthermore, when detecting the section D4 at the rear end of the first column in the left region and then detecting the section D6 at the rear end of the column of the left region, the extension condition of the boundary line B of the section D6, which is different from that of the section D4, is applied.

Figure 21A:
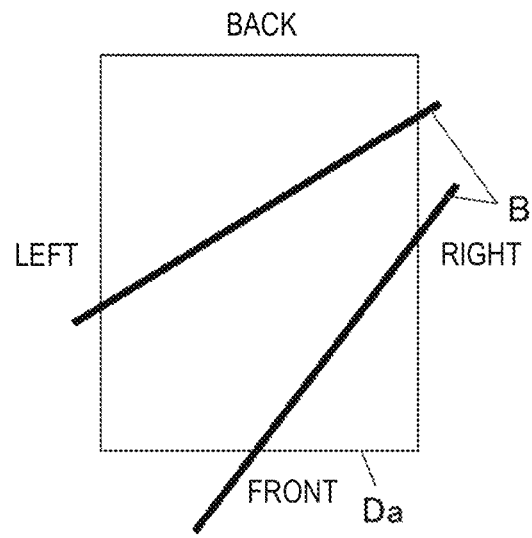
FIG. 21A shows extension conditions for a boundary line at a rear end of the left region.

As shown in FIG. 21A, the extension condition of the boundary line B in the section D6 at the rear end of the column in the left region is that the boundary line B passes through the front and right sides of the section range Da, or the left and right sides of the section range Da, and when any of these extension conditions is satisfied, the section D6 positioned at the rear end of the column can be detected.

Also in this case, if the direction of proceeding immediately before detection of the section D6 was backward in the main scanning direction, when the section D6 is detected, the next direction of proceeding is now leftward in the sub scanning direction and accordingly, the process moves to the next column.

In addition, if the direction of proceeding immediately before detection of the section D6 was leftward in the sub scanning direction (that is, movement to the adjacent column), the section D6 positioned at the rear end of the column is searched, and if not found, the search is repeated until the section D6 is found, by moving according to a predetermined unit of sections in the direction opposite to the direction of proceeding in the immediately preceding column. Then, upon detecting the section D6, the next direction of proceeding is now forward in the main scanning direction.

Likewise, when detecting the section D5 at the front end of the first column of the left region and then detecting the section D7 at the front end of the column of the left region, the extension condition of the boundary line B of the section D7, which is different from that of the section D5, is applied.

Figure 21B:
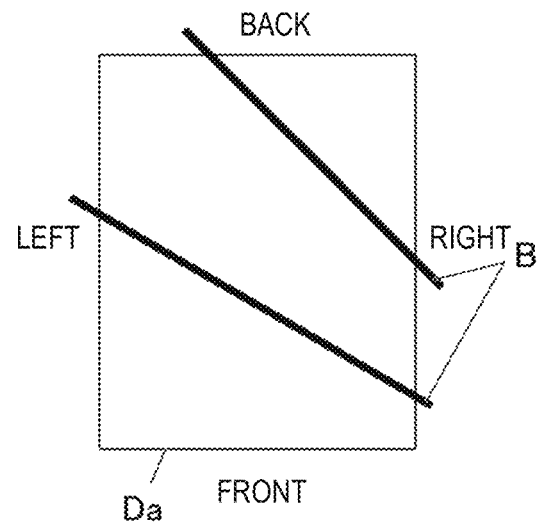
FIG. 21B shows extension conditions for a boundary line at a front end of the column in the left region.

As shown in FIG. 21B, the extension condition of the boundary line B in the section D7 at the front end of the column in the left region is that the boundary line B passes through the rear and right sides of the section range Da, or the left and right sides of the section range Da, and when any of these extension conditions is satisfied, the section D7 positioned at the front end of the column can be detected.

Also in this case, if the direction of proceeding immediately before detection of the section D7 was forward in the main scanning direction, when the section D7 is detected, the next direction of proceeding is now leftward in the sub scanning direction and accordingly, the process moves to the next column.

In addition, if the direction of proceeding immediately before the detection of the section D7 was leftward in the sub scanning direction (that is, movement to the adjacent column), a section D7 positioned at the front end of the column is searched, and if not found, the search is repeated until the section D7 is found, by moving according to a predetermined unit of sections in the direction opposite to the direction of proceeding in the immediately preceding column. Then, upon detecting the section D7, the next direction of proceeding is now backward in the main scanning direction.

In addition, when detecting the section D4 at the rear end of the first column in the left region and then detecting the section D6 at the rear end of the column of the left region, and when detecting the section D5 of the front end of the first column of the left region and then detecting the section D7 of the front end of the column of the left region, it is determined at the same time whether or not the current column is the last column (leftmost column) in the target range of hair planting.

That is, if the extension condition is not satisfied when determining the extension condition of the boundary line B of the section D6, and if the extension condition is not satisfied when determining the extension condition of the boundary line B of the section D7, it is determined whether or not the extension condition of the boundary line B indicating the last column is satisfied.

Figure 22:
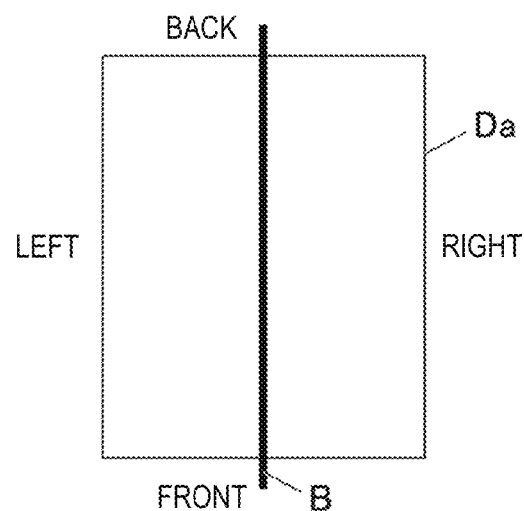
FIG. 22 shows extension conditions for a boundary line indicating a last column.

As shown in FIG. 22, the extension condition of the boundary line B indicative of the last column is that the boundary line B passes through the front and rear sides of the section range Da, and when this extension condition is satisfied, it can be detected that the current column is the last column.

Upon detecting that the current column is the last column, the feed control unit 105 finishes the planting by detecting the next section D6 or the section D7.

In order to perform planting on all sections D positioned in the target range of hair planting attached to the base material J, the feed control unit 105 performs control for determining the direction of proceeding of the next section D fed by the feed device 40 according to the extension conditions of the boundary line B imaged within the section range Da corresponding to the section within the imaging range of the camera 11.

This eliminates the need for the operator to input operations and settings for performing hair planting over the entire target range of hair planting, and enables extremely efficient hair planting operation.

In addition, when planting a single base material J, there is no need for an operator's operation and the like after the start of planting, so it is possible to significantly reduce the burden on the operator.

Further, the feed control unit 105 causes the feed device 40 to move the base material J to the next section in a certain column direction, and performs control to determine whether to proceed along the current column or move to the next column according to the extension condition of the boundary line B within the section range Da imaged by the camera 11.

As a result, the process moves to the section for hair planting appropriately, such that it is possible to proceed the hair planting efficiently.

In addition, since the feed control unit 105 performs control to finish hair planting according to the extension conditions of the boundary line B within the section range Da imaged within the imaging range of the camera 11, there is no need to monitor the completion of the hair planting operation, such that it is possible to further reduce the burden on the operator.

In addition, in other forms of feed control, for example, if the number of sections in the column direction (front-and-back direction) and the number of sections in the row direction (left-and-right direction) of the sewing area are predetermined and known numbers, the above process can be further simplified.

For example, by sequentially recording the number of sections proceeded in the column direction (front-and-back direction) and the row direction (left-and-right direction), it is possible to recognize the position of the section D in which the current hair planting operation is performed within the range of hair planting.

As a result, for example, by determining in advance a column that is a certain number of columns away from the right to be the start of the left region, it is possible to set a virtual center line that serves as a boundary between the right region and the left region, and to omit the process of determining whether or not to switch based on a captured image.

Likewise, by determining in advance a column that is away by a certain number of columns to be the last column, it is possible to omit the process of determining the last column from the captured image.

What is claimed is:

1. A hair planting apparatus comprising:
   a mounting portion for mounting a base material where planting is performed, and including a work opening for planting;
   a hair planting unit for binding hair for planting to the base material in the work opening of the mounting portion;
   a movable stage configured to position the hair planting unit relative to each mesh hole of the base material mounted on the mounting portion;
   an imaging sensor configured to capture images of a plurality of mesh holes of the base material mounted on the mounting portion;
   a rotatable pressing plate configured to change an orientation of the base material on the mounting portion with respect to the imaging sensor; and
   a controller, wherein the controller includes a processor that is configured to execute instructions to perform the method including: obtaining, from the image captured by the imaging sensor, an alignment direction of the plurality of mesh holes of the base material, and correcting, by the rotatable pressing plate, the orientation of the base material on the mounting portion according to a tilt angle of the alignment direction of the plurality of mesh holes of the base material with respect to a predetermined direction.

2. The hair planting apparatus according to claim 1, wherein the controller is further configured to cause the rotatable pressing plate to rotate the base material to correct the orientation thereof relative to the mounting portion.

3. The hair planting apparatus according to claim 1, wherein the correction mechanism rotates the mounting portion together with the base material to correct the orientation of the base material.

4. The hair planting apparatus according to claim 1, wherein the controller is further configured to cause the imaging sensor to capture an image of the base material from below through the work opening of the mounting portion, the hair planting unit includes a needle configured to pull the hair for planting into the mesh holes of the base material from below through the work opening of the mounting portion, and the apparatus further comprising:

a moveable position switch plate configured to switch positions of the imaging sensor and the needle so as to face the work opening from below.

5. The hair planting apparatus according to claim 4, wherein the needle is a hook needle that is configured to be inserted from below through the mesh hole in the base material, and the controller is further configured to cause the moveable position switch plate to perform the position switch such that the hook needle and an optical axis of the imaging sensor are switched on the same axis.

6. The hair planting apparatus according to claim 1, further comprising:

at least one roller configured to feed the base material mounted on the mounting portion according to a predetermined unit of sections for performing hair planting operation, wherein the controller controls the at least one roller such that, with respect to the plurality of sections expanded in a row direction and a column direction, the hair planting operation proceeds one by one in the section in the row direction or the column direction, the base material is configured to be attached within a boundary line, the boundary line indicating the entire target range of hair planting, and the controller is further configured to determine a direction of proceeding of the next section to be fed by the at least one roller in accordance with extension conditions of the boundary line imaged within a section range corresponding to the section within an imaging range of the imaging sensor, so as to perform hair planting in all the sections positioned in the target range of hair planting.

7. The hair planting apparatus according to claim 6, wherein the controller is further configured to cause the base material to be moved to the next section in a certain column direction by the at least one roller, and determine whether to move along a current column or move to a next column in accordance with the extension conditions of the boundary line within the section range imaged by the imaging sensor.

* * * * *